United States Patent
Kondou

(10) Patent No.: US 10,384,280 B2
(45) Date of Patent: Aug. 20, 2019

(54) ROTARY CUTTING TOOL

(71) Applicant: TUNGALOY CORPORATION, Fukushima (JP)

(72) Inventor: Yuuma Kondou, Iwaki (JP)

(73) Assignee: TUNGALOY CORPORATION, Iwak-shi, Fukushima (JP)

( * ) Notice: Subject to any disclaimer, the term of this patent is extended or adjusted under 35 U.S.C. 154(b) by 0 days.

(21) Appl. No.: 15/966,182

(22) Filed: Apr. 30, 2018

(65) Prior Publication Data

US 2018/0326510 A1  Nov. 15, 2018

(30) Foreign Application Priority Data

May 11, 2017  (JP) ................................ 2017-094341

(51) Int. Cl.
```
B23C 5/24    (2006.01)
B23C 5/22    (2006.01)
B23C 5/08    (2006.01)
B23C 5/20    (2006.01)
```

(52) U.S. Cl.
CPC .............. *B23C 5/2427* (2013.01); *B23C 5/08* (2013.01); *B23C 5/207* (2013.01); *B23C 5/2226* (2013.01); *B23C 5/2247* (2013.01); *B23C 5/241* (2013.01); *B23C 5/2472* (2013.01); *B23C 5/2475* (2013.01); *B23B 2200/3654* (2013.01); *B23C 2200/0461* (2013.01); *B23C 2200/0483* (2013.01); *B23C 2200/128* (2013.01); *B23C 2210/287* (2013.01)

(58) Field of Classification Search
CPC ... B23C 5/2427; B23C 5/2226; B23C 5/2252; B23C 2210/287
See application file for complete search history.

(56) References Cited

U.S. PATENT DOCUMENTS

| | | | |
|---|---|---|---|
| 1,015,409 A |  | 1/1912 | Taylor |
| 3,189,976 A | * | 6/1965 | Pickril .............. B23B 29/03417 407/76 |
| 4,165,947 A |  | 8/1979 | Smids |

(Continued)

FOREIGN PATENT DOCUMENTS

| | | |
|---|---|---|
| DE | 2144458 A1 | 3/1972 |
| DE | 102005022336 A1 | 11/2006 |

(Continued)

*Primary Examiner* — Alan Snyder
(74) *Attorney, Agent, or Firm* — Studebaker & Brackett PC

(57) ABSTRACT

A rotary cutting tool is provided which, although it has a simple configuration, allows the arrangement of each cutting edge to be easily adjusted. A first cartridge mounting seat has an upper wall surface opposing an outer side surface of a cartridge and further has a first recessed part into which a protrusion is inserted and which comes into contact, at a bottom thereof, with a leading end of the protrusion. A second cartridge mounting seat has an upper wall surface opposing an outer side surface of a cartridge and further has a second recessed part into which a protrusion is inserted and which comes into contact, at a bottom thereof, with a leading end of the protrusion. A depth of the second recessed part is greater than a depth of the first recessed part. An amount of protrusion P of the protrusion is equal to or greater than the depth of the second recessed part.

8 Claims, 17 Drawing Sheets

(56) References Cited

U.S. PATENT DOCUMENTS

| | | | | |
|---|---|---|---|---|
| 4,547,100 | A | * 10/1985 | Naccarato | B23C 5/2427 407/39 |
| 7,927,047 | B2 | * 4/2011 | Lysobey | B23B 29/03 407/30 |
| 2002/0154957 | A1 | 10/2002 | Mizutani | |
| 2004/0191008 | A1 | 9/2004 | Noggle et al. | |
| 2017/0216940 | A1 | 8/2017 | Aso | |

FOREIGN PATENT DOCUMENTS

| | | |
|---|---|---|
| DE | 202009013048 U1 | 2/2010 |
| FR | 2107215 A5 | 5/1972 |
| JP | 2006-159350 A | 6/2006 |
| WO | 2016/017780 A1 | 2/2016 |

* cited by examiner

ROTARY CUTTING TOOL

TECHNICAL FIELD

The present invention relates to a rotary cutting tool which cuts a workpiece through rotation.

BACKGROUND ART

A rotary cutting tool which comprises a plurality of cutting inserts and which cuts a workpiece through rotation has become common. The cutting inserts are arranged so as to be spaced from one another, and each of the cutting inserts is mounted on a body of the rotary cutting tool with a cutting edge of the cutting insert facing outward. The respective cutting edges of the cutting inserts are arranged such that at least parts of rotation trajectories of the cutting edges overlap with one another.

Further, a cutting insert (see Patent Document 1) is known in which cutting edges thereof are each divided into portions by grooves referred to as nicks, and a cutting insert is also known in which cutting edges thereof are each provided with irregularities. These cutting inserts can each reduce cutting resistances by separating chips generated during cutting into small pieces; however, portions which remain uncut are produced in a machined surface of a workpiece. Therefore, when using either of the above cutting inserts by being mounted on the above rotary cutting tool, the arrangement of each cutting edge needs to be adjusted such that portions which remain uncut by a cutting edge are cut by another following cutting edge.

Patent Document 2 discloses a rotary cutting tool in which the arrangement of each cutting edge can be adjusted. In such rotary cutting tool, each cutting insert is mounted on a body via a cartridge. A screw is arranged between a wall surface of the body and an outer side surface of the cartridge, and the body is provided with a threaded hole into which the screw is screwed. A distance between the wall surface of the body and the outer side surface of the cartridge is varied by adjusting the screwing of the screw, whereby the arrangement of each cutting edge can be adjusted.

With the configuration of mounting a cutting insert on a body via a cartridge, as in the rotary cutting tool disclosed in Patent Document 2, when, for example, an excessive force works on the cutting insert, the cartridge will fracture ahead of the body. This prevents fracturing of the body, which is expensive, and allows the rotary cutting tool to restart cutting by way of the replacement of the cartridge alone.

CITATION LIST

Patent Document

Patent Document 1: WO2016/017780
Patent Document 2: JP2006-159350 A

SUMMARY

Technical Problem

When utilizing a plurality of cutting inserts having nicks to the rotary cutting tool disclosed in Patent Document 2, the arrangement of each cutting edge needs to be adjusted by adjusting the screwing of a plurality of screws. Further, even when employing cutting inserts having no nicks, the arrangement of each cutting edge may need to be adjusted in order to make the cutting resistances—which work on cutting edges of the cutting inserts—uniform and in turn to extend the lives of the cutting edges. In order to confirm that the arrangement of each cutting edge has been properly adjusted, it is necessary to conduct, for example, the work of cutting a workpiece on an exploratory basis and then checking the resulting machined surface. Given the above, the rotary cutting tool disclosed in Patent Document 2 has had a problem in that the work of adjusting the arrangement of each cutting edge is complicated.

When attempting to mount, on a rotary cutting tool, a new adjustment mechanism which facilitates the adjustment of each cutting edge, this may invite an increased manufacturing cost of the rotary cutting tool. Further, the rotary cutting tool has had a problem in that, when using a cutting insert which does not especially require the adjustment of the arrangement of each cutting edge (for example, cutting inserts having no nicks) by being mounted on a body of the rotary cutting tool, an adjustment mechanism is useless and is therefore uneconomical.

The present invention has been made in light of the above problems, and an object of the present invention is to provide a rotary cutting tool which, although it has a simple configuration, allows the arrangement of each cutting edge to be easily adjusted.

Solution to Problem

In order to solve the above problems, a rotary cutting tool according to the present invention comprises: a plurality of cutting inserts each having a cutting edge; a plurality of cartridges each having an insert mounting seat on which the cutting insert is mounted; and a body having a first cartridge mounting seat and a second cartridge mounting seat at positions separate from each other in a circumferential direction of a predetermined axis, the first cartridge mounting seat and the second cartridge mounting seat each having the cartridge mounted thereon. The cartridge has a protrusion in an outer side surface of the cartridge. The first cartridge mounting seat has: a first wall surface opposing the outer side surface of the cartridge mounted on the first cartridge mounting seat; and a first recessed part which is formed in the first wall surface, into which the protrusion is inserted, and which comes into contact, at a bottom thereof, with a leading end of the protrusion. The second cartridge mounting seat has: a second wall surface which faces in the same direction as the first wall surface and which opposes the outer side surface of the cartridge mounted on the second cartridge mounting seat; and a second recessed part which is formed in the second wall surface, into which the protrusion is inserted, and which comes into contact, at a bottom thereof, with the leading end of the protrusion. A depth of the second recessed part is greater than a depth of the first recessed part. An amount of protrusion of the protrusion is equal to or greater than the depth of the second recessed part.

In order to facilitate the understanding of the description, the cartridge mounted on the first cartridge mounting seat is referred to as a "first cartridge," and the cartridge mounted on the second cartridge mounting seat is referred to as a "second cartridge." Further, from among the outer side surfaces of the first cartridge, the outer side surface opposing the first wall surface of the first cartridge mounting seat is referred to as a "first outer side surface," and from among the outer side surfaces of the second cartridge, the outer side surface opposing the second wall surface of the second cartridge mounting seat is referred to as a "second outer side surface."

With the above configuration, the protrusion of the first outer side surface of the first cartridge is inserted into the first recessed part formed in the first wall surface of the first cartridge mounting seat. Further, the protrusion of the second outer side surface of the second cartridge is inserted into the second recessed part formed in the second wall surface of the second cartridge mounting seat.

The depth of the second recessed part is greater than the depth of the first recessed part. Further, the amount of protrusion of the protrusion of each cartridge is equal to or greater than the depth of the second recessed part. Thus, the protrusion of the second cartridge is inserted deeper than the protrusion of the first cartridge. As a result, a distance from the second outer side surface of the second cartridge to the second wall surface of the second cartridge mounting seat is shorter than a distance from the first outer side surface of the first cartridge to the first wall surface of the first cartridge mounting seat.

Accordingly, with the above configuration, based on the difference in the distance which occurs, as described above, between the first cartridge and the second cartridge, the arrangement of each cutting edge of the cutting insert mounted on each of the first and second cartridges can be adjusted. To be more specific, when mounting the cartridge on the first cartridge mounting seat or the second cartridge mounting seat, the arrangement of each cutting edge can be adjusted through the simple work of inserting the protrusion into the first recessed part or the second recessed part and then bringing the leading end of the protrusion into contact with the bottom of the first recessed part or the second recessed part.

Further, when using a cutting insert which does not especially require the adjustment of the arrangement of each cutting edge, a cartridge may be separately prepared which does not have a protrusion in an outer side surface thereof. By mounting the cutting insert on the cartridge with no protrusion and then mounting such cartridge on the first cartridge mounting seat or the second cartridge mounting seat, the cutting insert can be mounted on the body via the cartridge without the need for the adjustment of the arrangement of each cutting edge.

The first recessed part and the second recessed part may be formed so as to extend in a direction substantially parallel to the axis.

With the above configuration, the arrangement of each cutting edge can be adjusted in the direction substantially parallel to the axis. For instance, in a rotary cutting tool in which an axis thereof is arranged so as to extend in the vertical direction, the arrangement of each cutting edge can be adjusted in the vertical direction.

The first recessed part and the second recessed part may be formed so as to extend in a direction substantially orthogonal to the axis.

With the above configuration, the arrangement of each cutting edge can be adjusted in the direction substantially orthogonal to the axis. For instance, in a rotary cutting tool in which an axis thereof is arranged so as to extend in the vertical direction, the arrangement of each cutting edge can be adjusted in the horizontal direction.

The width of the first recessed part and the width of the second recessed part may each be greater than the width of the protrusion.

As described above, the arrangement of each cutting edge is adjusted by the leading end of the protrusion of the cartridge coming into contact with the bottom of the first recessed part or the second recessed part. In other words, the width of the first recessed part and the width of the second recessed part do not affect the adjustment of the arrangement of each cutting edge. Therefore, by making each of the width of the first recessed part and the width of the second recessed part greater than the width of the protrusion, the arrangement of each cutting edge can be adjusted while the protrusion can be smoothly inserted into the first recessed part or the second recessed part.

The amount of protrusion of the protrusion may be greater than the depth of the second recessed part.

When the amount of protrusion of the protrusion is greater than the depth of the second recessed part, the outer side surface of the cartridge comes into contact with neither the first wall surface of the first cartridge mounting seat nor the second wall surface of the second cartridge mounting seat. In other words, the arrangement of each cutting edge is defined by the position of the leading end of the protrusion rather than the position of the outer side surface provided with the protrusion.

That is, when the amount of protrusion of the protrusion is greater than the depth of the second recessed part, high accuracy is not required for the dimension ranging from the cutting edge of the cutting insert to the outer side surface of the cartridge because such dimension does not affect the adjustment of the arrangement of each cutting edge. As a result, it becomes possible to easily manage dimension accuracy during the manufacture of the cartridge.

The cartridge may be provided with a through hole, the first cartridge mounting seat may be provided with a first bolt hole into which a first bolt is screwed, such first bolt being inserted through the through hole of the cartridge, and the second cartridge mounting seat may be provided with a second bolt hole into which a second bolt is screwed, such second bolt being inserted through the through hole of the cartridge. The first bolt hole may be inclined so as to approach the first wall surface, heading in a screwing direction of the first bolt, and the second bolt hole may be inclined so as to approach the second wall surface, heading in a screwing direction of the second bolt.

With the above configuration, the cartridge can be mounted on the first cartridge mounting seat or the second cartridge mounting seat by means of the first bolt or the second bolt which is inserted through the through hole. Since the first bolt hole and the second bolt hole are each inclined, the first bolt or the second bolt which is screwed into the first bolt hole or the second bolt hole can press the cartridge against the first wall surface or the second wall surface. This reliably brings the leading end of the protrusion of the cartridge into contact with the bottom of the first recessed part or the second recessed part, and this allows the arrangement of each cutting edge to be adjusted in a more reliable manner.

The through hole of the cartridge may have a long-hole shape whose longitudinal direction is served by a protruding direction of the protrusion.

With the above configuration, the first bolt or the second bolt which has been inserted through the through hole of the cartridge is inclined, and this allows the first bolt or the second bolt to be reliably screwed into the first bolt hole or the second bolt hole.

A center of the protrusion may be offset from a central axis of the through hole of the cartridge.

When a cutting resistance works on the cutting edge of the cutting insert, a moment about a part of the cartridge which is near the through hole works on the cartridge. When the center of the protrusion is offset from the central axis of the through hole of the cartridge, this moment can be resisted by a counterforce received by the leading end of the protrusion from the bottom of the first recessed part or the second recessed part. This can maintain a state in which the cartridge is mounted on the first cartridge mounting seat or the second cartridge mounting seat. That is, with the above configuration, the protrusion provided for the adjustment of the arrangement of each cutting edge can also be utilized for stable mounting of the cartridge.

Advantageous Effects of Invention

The present invention can provide a rotary cutting tool which, although it has a simple configuration, allows the arrangement of each cutting edge to be easily adjusted.

DESCRIPTION OF EMBODIMENTS

Figure 1:
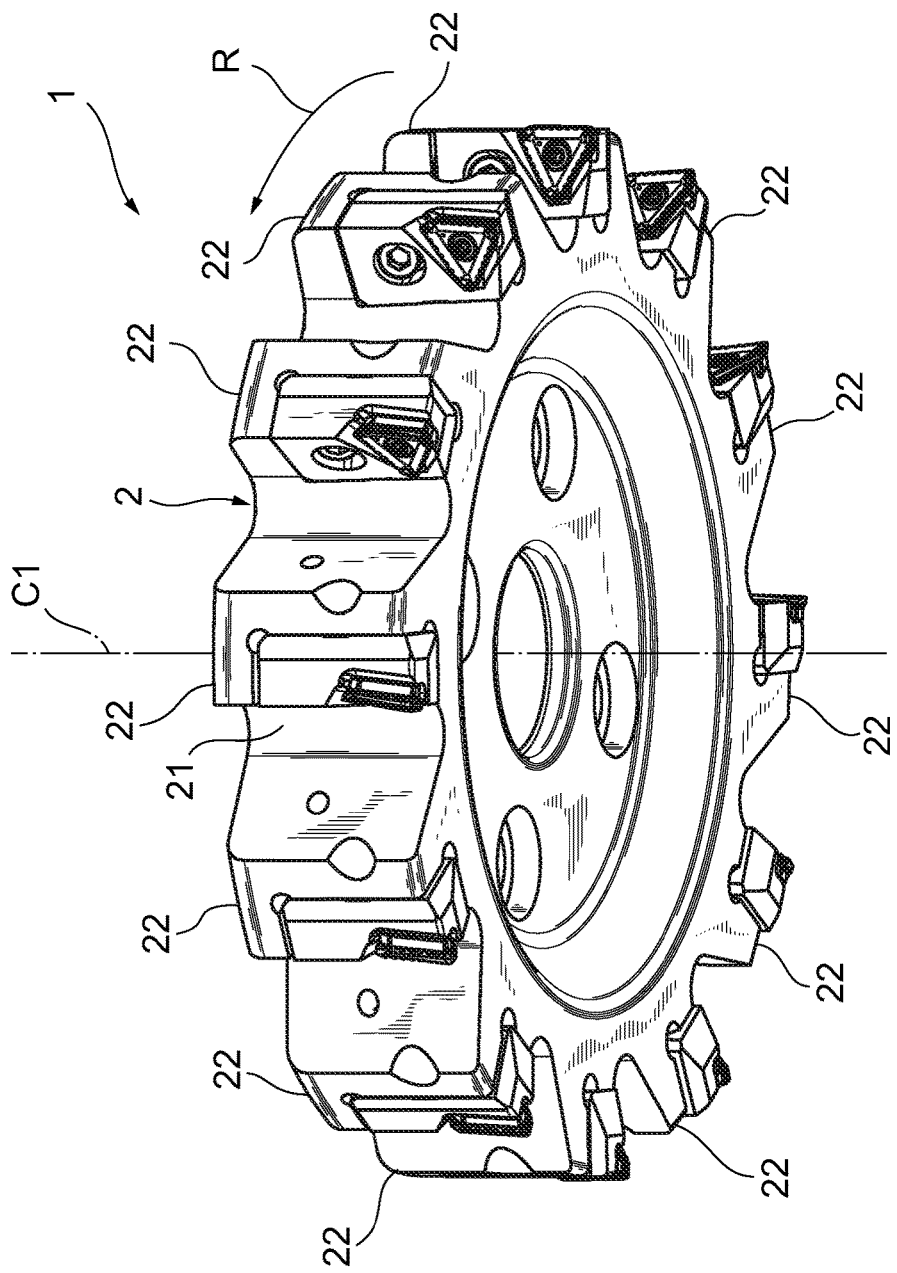
FIG. 1 is a perspective view of a rotary cutting tool according to a first embodiment.

Embodiments will now be described below with reference to the attached drawings. In order to facilitate the understanding of the description, the same elements are denoted by the same symbols to the extent possible in the drawings, and such elements will not be further explained.

First Embodiment

Figure 2:
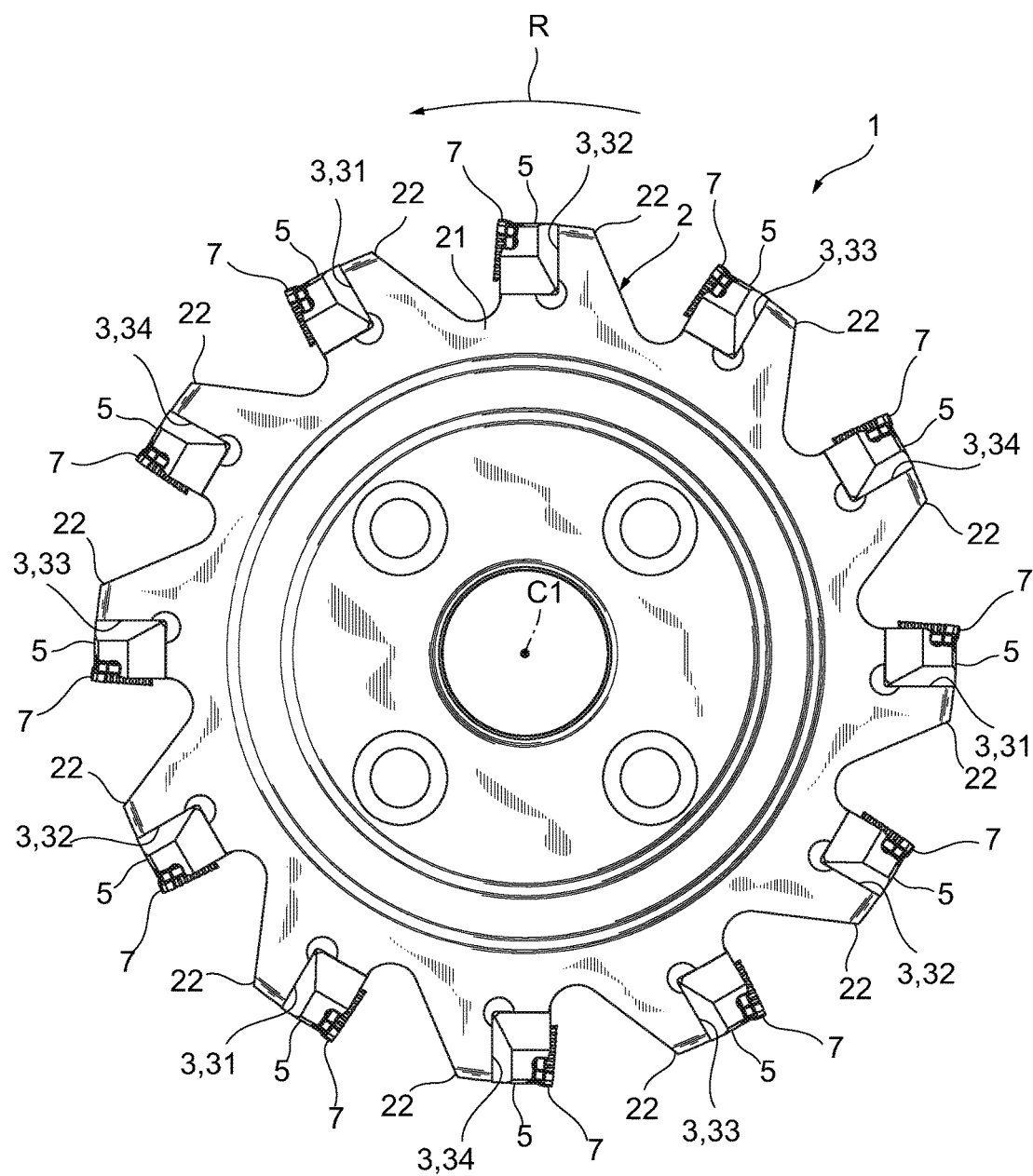
FIG. 2 is a bottom view of the rotary cutting tool of FIG. 1.

The outline of a rotary cutting tool 1 (hereinafter referred to as "cutting tool 1") according to a first embodiment will be described with reference to FIGS. 1 and 2. FIG. 1 is a perspective view of the cutting tool 1. FIG. 2 is a bottom view of the cutting tool 1.

The cutting tool 1 refers to a milling cutter or the like. The cutting tool 1 rotates about an axis C1 and thereby performs square shoulder milling, etc. on a workpiece. The cutting tool 1 includes a body 2, cartridges 5 and cutting inserts 7.

In the specification, description will be made regarding the cutting tool 1 in which: the axis C1, being a rotation center, extends in the vertical direction; and the cutting inserts 7 are arranged at a lower end of the cutting tool 1. Further, the upper side in the vertical direction is referred to as "upper," and the lower side therein is referred to as "lower." Moreover, a direction along the axis C1 is referred to as an "axial direction," a direction around the axis C1 is referred to as a "circumferential direction," and a direction orthogonal to the axis C1 is referred to as a "radial direction." The above arrangement of the cutting tool 1 does not limit the usage form of the present invention.

The body 2 is made of a metal material and has a base part 21 and twelve projected parts 22. The base part 21 is formed in a ring shape of rotational symmetry about the axis C1. The projected parts 22 are formed integrally with the base part 21 and are projected outward in the radial direction from an outer side surface of the base part 21. The projected parts 22 are formed, in the outer side surface of the base part 21, at positions separated from one another at regular intervals in the circumferential direction. That is, the projected parts 22 are arranged at substantially 30° intervals in the circumferential direction about the axis C1.

As shown in FIG. 2, the projected parts 22 are respectively provided with cartridge mounting seats 3. The cartridge mounting seat 3 is a generic name for a first cartridge mounting seat 31, a second cartridge mounting seat 32, a third cartridge mounting seat 33 and a fourth cartridge mounting seat 34. In further detail, the projected parts 22 are respectively provided with the first cartridge mounting seat 31, the second cartridge mounting seat 32, the third cartridge mounting seat 33 and the fourth cartridge mounting seat 34, in this order, in a direction opposite to the direction of an arrow R. The arrow R points out one side of the above circumferential direction. When referring to a combination of one first cartridge mounting seat 31, one second cartridge mounting seat 32, one third cartridge mounting seat 33 and one fourth cartridge mounting seat 34 as a "set of cartridge mounting seats," the body 2 has three sets of cartridge mounting seats.

One cartridge 5 is removably mounted on each cartridge mounting seat 3. The cartridge 5 is made of a metal material, and each cutting insert 7 is removably mounted on the cartridge 5.

The cutting insert 7 has cutting edges 74 (see FIGS. 4 and 5), which are described below. The cutting insert 7 is mounted on the body 2 via the cartridge 5.

An upper part of the base part 21 of the body 2 is fixed to a jig referred to as an arbor (not shown) or the like. When the jig rotates, the body 2 rotates in the direction indicated by the arrow R.

Through the rotation of the body 2, the cutting edges 74 of each cutting insert 7 rotate about the axis C1. The cutting insert 7 cuts a workpiece with the cutting edge 74 being caused to abut against a surface of the workpiece.

Figure 3:
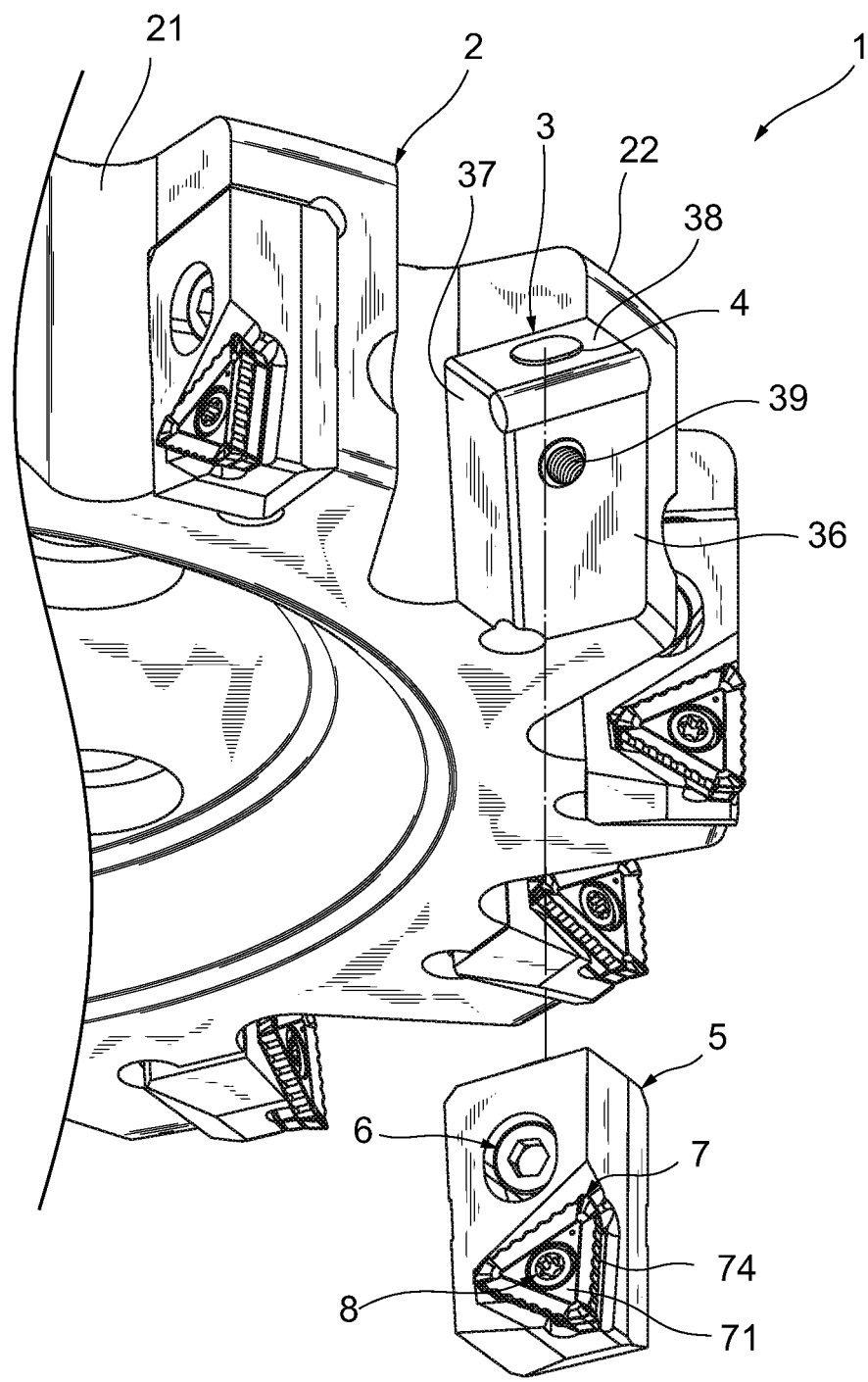
FIG. 3 is an exploded view of the rotary cutting tool of FIG. 1.
Figure 4:
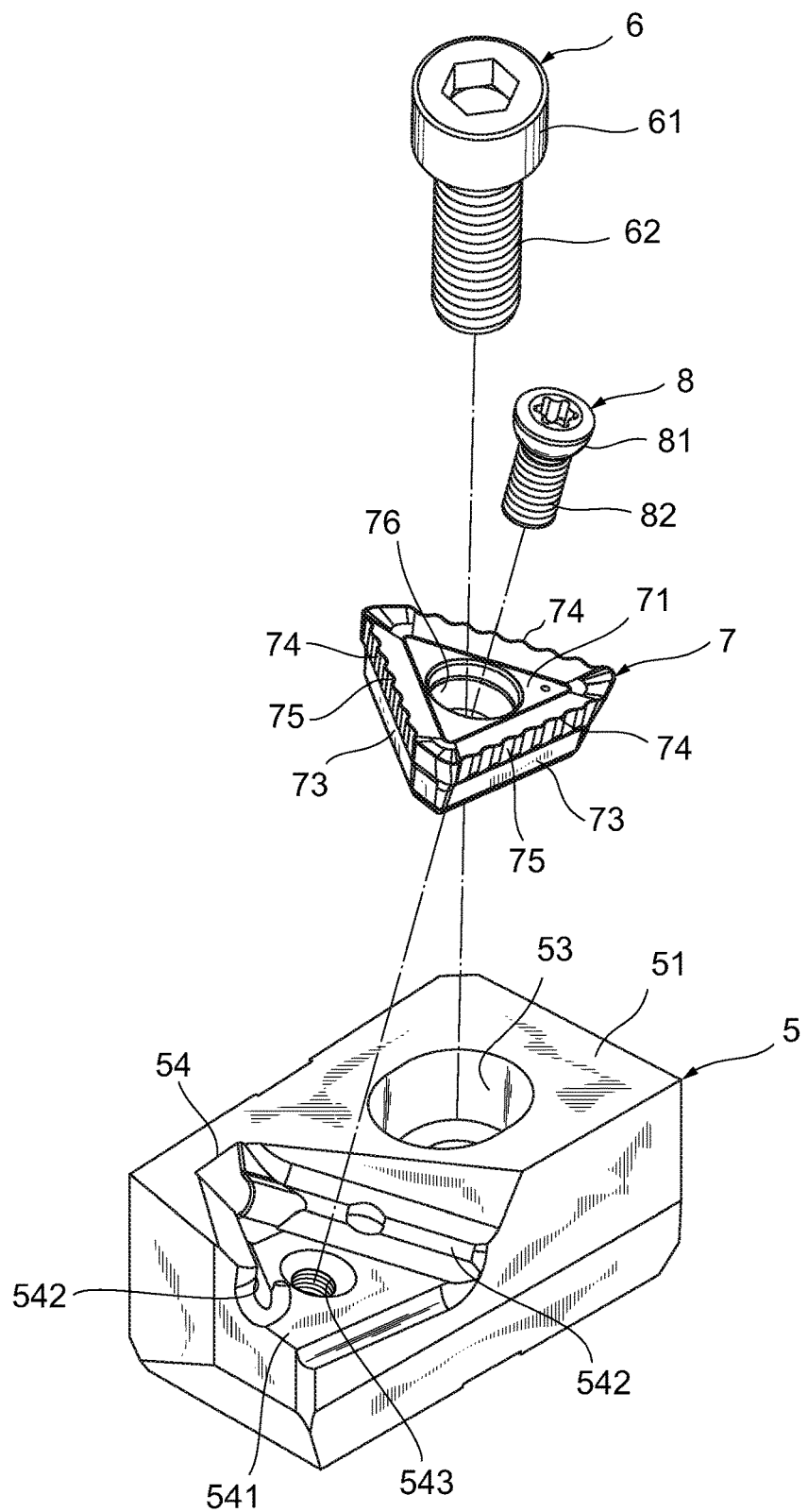
FIG. 4 is a perspective view of a cartridge and a cutting insert which are illustrated in FIG. 1.
Figure 5:
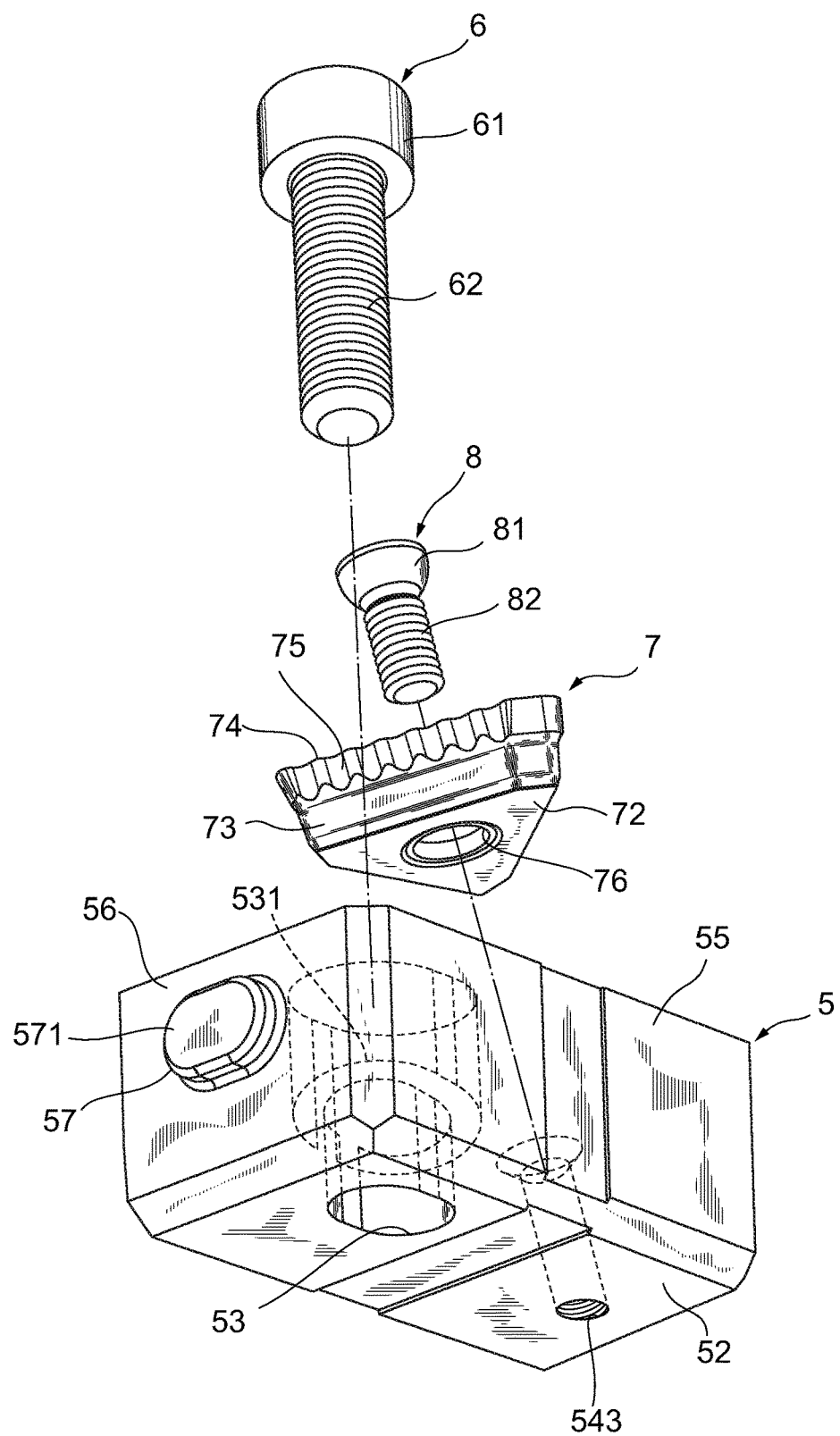
FIG. 5 is a perspective view of the cartridge and the cutting insert which are illustrated in FIG. 1.
Figure 6:
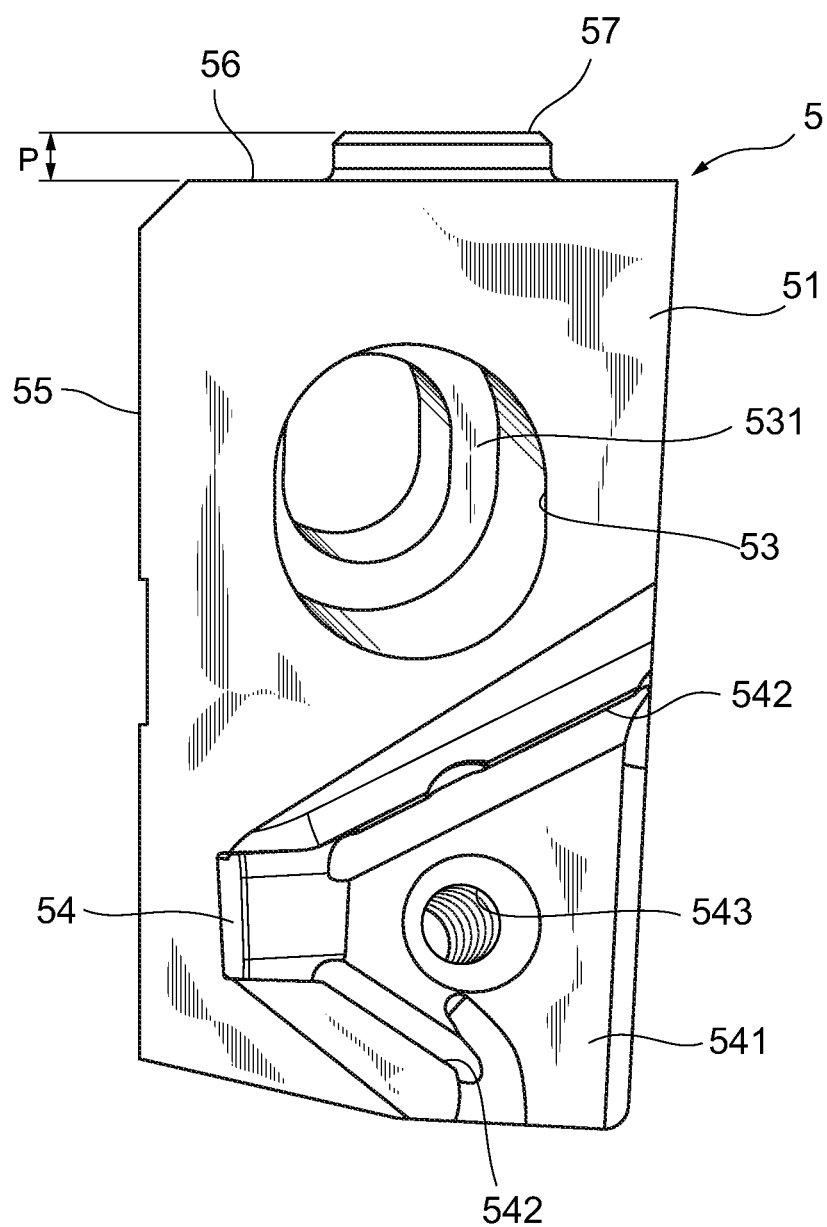
FIG. 6 is a plan view of a cartridge illustrated in FIG. 1.
Figure 7:
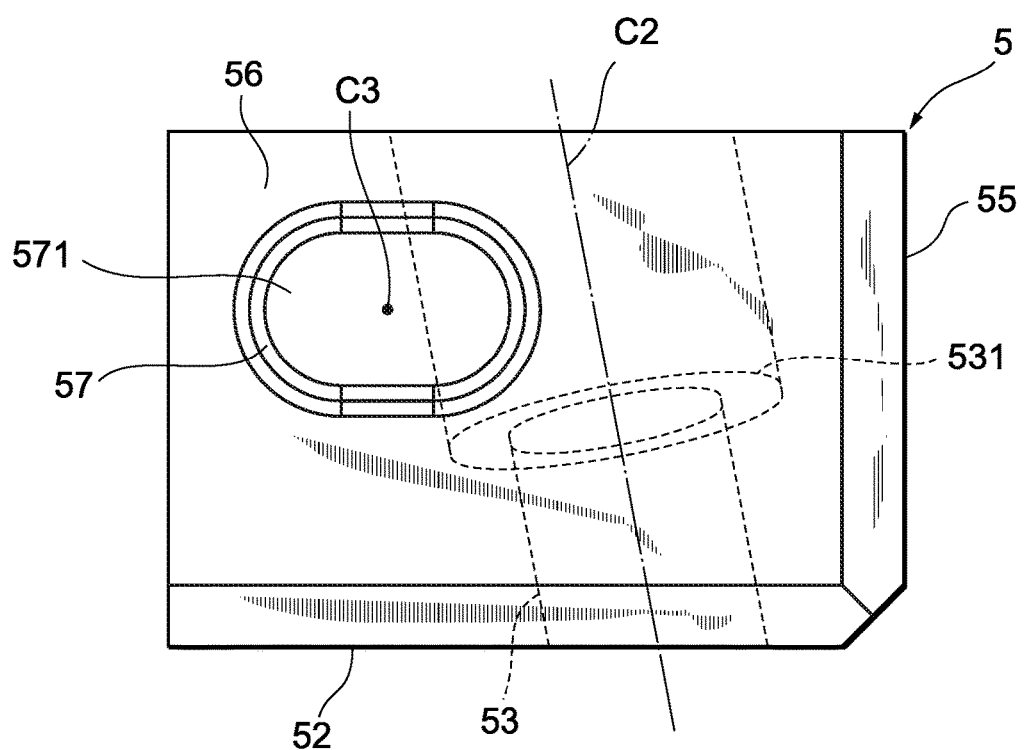
FIG. 7 is a side view of the cartridge illustrated in FIG. 1.

Next, the cartridge mounting seat 3, the cartridge 5 and the cutting insert 7 will be described in detail with reference to FIGS. 3 to 7. FIG. 3 is an exploded view of the cutting tool 1, the view showing part of the cutting tool 1 in an enlarged manner. Each of FIGS. 4 and 5 is a perspective view of the cartridge 5 and the cutting insert 7. FIG. 4 shows a state in which the cartridge 5 is seen from the upper surface 51 side. FIG. 5 shows a state in which the cartridge 5 is seen from the lower surface 52 side. FIG. 6 is a plan view of the cartridge 5. FIG. 7 is a side view of the cartridge 5, the view showing a state in which the cartridge 5 is seen in a direction facing an outer side surface 56 thereof.

As shown in FIG. 3, the cartridge mounting seat 3 is a recessed part whose lower portion and a radially outer portion are opened. The cartridge mounting seat 3 has a bottom surface 36, a side wall surface 37 and an upper wall surface 38. The bottom surface 36, the side wall surface 37 and the upper wall surface 38 are all flat surfaces. The bottom surface 36 faces in the circumferential direction. The side wall surface 37 is formed so as to face outward in the radial direction, to be substantially perpendicular to the bottom surface 36, and to be slightly inclined with respect to the axis C1 (see FIGS. 1 and 2). The upper wall surface 38 is formed so as to face in the axial direction (downward) and to be substantially perpendicular to the bottom surface 36 and the side wall surface 37.

In the bottom surface 36, a bolt hole 39 is formed at a position close to the upper wall surface 38. The bolt hole 39 is provided, in an inner side surface thereof, with an internal thread, and the bolt hole 39 is a hole into which a bolt 6 is screwed. A central axis C4 of the bolt hole 39 is inclined so as to approach the upper wall surface 38, heading in a screwing direction of the bolt 6 (i.e., a depth direction of the bolt hole 39) (see FIG. 9).

The upper wall surface 38 is provided, at substantially a center part thereof, with a recessed part 4. The recessed part 4 is a generic name for a first recessed part 41 (see FIG. 8) formed in the first cartridge mounting seat 31, a second recessed part 42 (see FIG. 10) formed in the second cartridge mounting seat 32, a third recessed part 43 (see FIG. 11) formed in the third cartridge mounting seat 33 and a fourth recessed part 44 (see FIG. 12) formed in the fourth cartridge mounting seat 34. The recessed part 4 is formed so as to be substantially perpendicular to the upper wall surface 38 and to extend in a direction substantially parallel to the axis C1. Further, a width of the recessed part 4 (i.e., a dimension of the recessed part 4 in a direction orthogonal to a direction in which the recessed part 4 extends) is greater than a width of a protrusion 57, which will be described below, of the cartridge 5.

As shown in FIGS. 4 and 5, the cartridge 5 has an upper surface 51 and a lower surface 52. The upper surface 51 and the lower surface 52 oppose each other and are substantially parallel to each other.

The cartridge 5 is provided with a through hole 53 which penetrates the upper surface 51 and the lower surface 52. As shown in FIG. 6, the through hole 53 is a countersunk hole inside which a stepped part 531 is formed. The through hole 53 has a long-hole shape whose longitudinal direction is served by a direction in which the protrusion 57, which will be described below, protrudes.

As shown in FIG. 4, an insert mounting seat 54 is formed in the upper surface 51 of the cartridge 5. The insert mounting seat 54 is a portion on which the cutting insert 7 is mounted and has a bottom surface 541 and two side wall surfaces 542. The bottom surface 541 is provided, at substantially a center part thereof, with a bolt hole 543. The bolt hole 543 is provided, in an inner side surface thereof, with an internal thread, and the bolt hole 543 is a hole into which a bolt 8 is screwed.

The cartridge 5 has a plurality of outer side surfaces, such as outer side surfaces 55 and 56, which connect an edge of the upper surface 51 and an edge of the lower surface 52. As shown in FIG. 5, the outer side surface 55 is arranged on a long-side side of the upper surface 51 and the lower surface 52 each having a substantially rectangular shape, and the outer side surface 56 is arranged on a short-side side thereof.

As shown in FIGS. 5 to 7, the outer side surface 56 of the cartridge 5 is provided with the protrusion 57. As shown in FIG. 6, the protrusion 57 protrudes by an amount of protrusion P in a direction substantially perpendicular to the outer side surface 56. The amount of protrusion P is greater than each of a depth D1 of the first recessed part 41, a depth D2 of the second recessed part 42, a depth D3 of the third recessed part 43 and a depth D4 of the fourth recessed part 44, which will be described below. As shown in FIG. 7, as seen from a direction facing the outer side surface 56, the protrusion 57 has an elliptical shape. Further, a center C3 of the protrusion 57 is offset from a central axis C2 of the through hole 53.

As shown in FIGS. 4 and 5, the cutting insert 7 has a first end surface 71 and a second end surface 72. The first surface 71 and the second end surface 72 oppose each other. The first surface 71 and the second end surface 72 are provided, at substantially center parts thereof, with a through hole 76 which penetrates the first end surface 71 and the second end surface 72. The first end surface 71 and the second end surface 72 each have a substantially triangular shape of rotational symmetry about a central axis of the through hole 76.

The cutting insert 7 further has three peripheral side surfaces 73 which connect an edge of the first end surface 71 and an edge of the second end surface 72. An intersecting edge between the first end surface 71 and each peripheral side surface 73 is regarded as the cutting edge 74. That is, the cutting insert 7 has three cutting edges 74.

Each peripheral side surface 73 is provided with a plurality of nicks 75. The nicks 75 are each a groove which extends from the first end surface 71 toward the second end surface 72, and the nicks 75 are arranged so as to be spaced from one another along the cutting edge 74. Each cutting edge 74 is divided into portions by the plurality of nicks 75. Portions of the cutting edge 74 which correspond to the nicks 75 do not substantially contribute to cutting. That is, portions of each cutting edge 74 which substantially contribute to cutting are divided portions.

The cutting insert 7 is arranged on the insert mounting seat 54 of the cartridge 5 such that the second end surface 72 comes into contact with the bottom surface 541 of the insert mounting seat 54 and the peripheral side surfaces 73 come into contact with the side wall surfaces 542 of the insert mounting seat 54. The cutting insert 7 is sandwiched by the two side wall surfaces 542 and is arranged at a posture in which the cutting edge 74 is exposed outward from the cartridge 5. When the cutting insert 7 is arranged on the insert mounting seat 54, the through hole 76 of the cutting insert 7 is continuous with the bolt hole 543 of the cartridge 5.

The bolt 8 is inserted through the through hole 76 of the cutting insert 7. As to the bolt 8, a shaft part 82 thereof provided with an external thread is screwed into the bolt hole 543 of the cartridge 5. When the shaft part 82 is screwed into the bolt hole 543, a head part 81 of the bolt 8 comes into contact with an inner side surface of the through hole 76, so that the cutting insert 7 is pressed against the bottom surface 541. Thus, the cutting insert 7 is mounted on the insert mounting seat 54.

The cartridge 5 on which the cutting insert 7 has been mounted is arranged on each cartridge mounting seat 3 of the body 2, as shown in FIG. 3. The cartridges 5 which are mounted on the respective cartridge mounting seats 3 all have the same shape. The cartridge 5 is arranged such that the lower surface 52 (see FIG. 5) comes into contact with the bottom surface 36 of the cartridge mounting seat 3 and the outer side surface 55 (see FIG. 5) comes into contact with the side wall surface 37 of the cartridge mounting seat 3.

The outer side surface 56 (see FIG. 5) of the cartridge 5 is arranged so as to oppose the upper wall surface 38 of the cartridge mounting seat 3. Further, the protrusion 57 formed in the outer side surface 56 is inserted into the recessed part 4 of the cartridge mounting seat 3. When the protrusion 57 is inserted into the recessed part 4, the leading end 571 (see FIG. 5) comes into contact with a bottom of the recessed part 4. When the cartridge 5 is arranged on the cartridge mounting seat 3, the through hole 53 of the cartridge 5 is continuous with the bolt hole 39 of the cartridge mounting seat 3.

As shown in FIGS. 4 and 5, the bolt 6 is inserted through the through hole 53 of the cartridge 5. As to the bolt 6, a shaft part 62 thereof provided with an external thread is screwed into the bolt hole 39 (see FIG. 3) of the cartridge mounting seat 3. When the shaft part 62 is screwed into the bolt hole 39, a heat part 61 of the bolt 6 comes into contact with the stepped part 531 (see FIG. 6) of the through hole 53 and thereby presses the cartridge against the bottom surface 36. Thus, the cartridge 5 is mounted on the cartridge mounting seat 3.

As shown in FIG. 3, when the cutting insert 7 is mounted on the body 2 via the cartridge 5, the cutting edge 74 is arranged so as to face outward in the radial direction and to extend in substantially the axial direction. When the body 2 rotates in the direction indicated by the arrow R (see FIGS. 1 and 2), each cutting edge 74 cuts a workpiece while creating a rotational trajectory about the axis C1 (see FIGS. 1 and 2). At this time, the first end surface 71 of the cutting insert 7 functions as a rake surface, and the peripheral side surface 73 thereof functions as a flank.

When fracturing, etc. occurs in the cutting edge 74, the cutting insert 7 is removed from the cartridge 5 and is then changed in terms of the direction, whereby the cutting tool 1 can restart cutting. In other words, the removed cutting insert 7 is mounted on the cartridge 5 again such that another cutting edge 74 faces outward in the radial direction, whereby cutting can be restarted with the other cutting edge 74.

As described above, each cutting edge 74 of the cutting insert 7 is divided into portions by the plurality of nicks 75. Thus, chips generated by the cutting edge 74 are separated into small pieces, so that the cutting resistance can be reduced. Therefore, the time required for machining can be shortened by increasing an amount of cutting depth of the cutting edge 74.

With the cutting insert 7 provided with the nicks 75, portions which remain uncut are produced in a machined surface of a workpiece during cutting. Specifically, as to a cutting edge 74 arranged so as to extend in the axial direction, the portions of the cutting edge 74 which substantially contribute to cutting are axially divided portions, and thus, multiple portions which remain uncut are produced. Therefore, the arrangement of each cutting edge 74 in the axial direction needs to be adjusted such that portions which remain uncut by the cutting edge 74 of a given cutting insert 7 are cut by the cutting edge 74 of another cutting insert 7.

Figure 8:
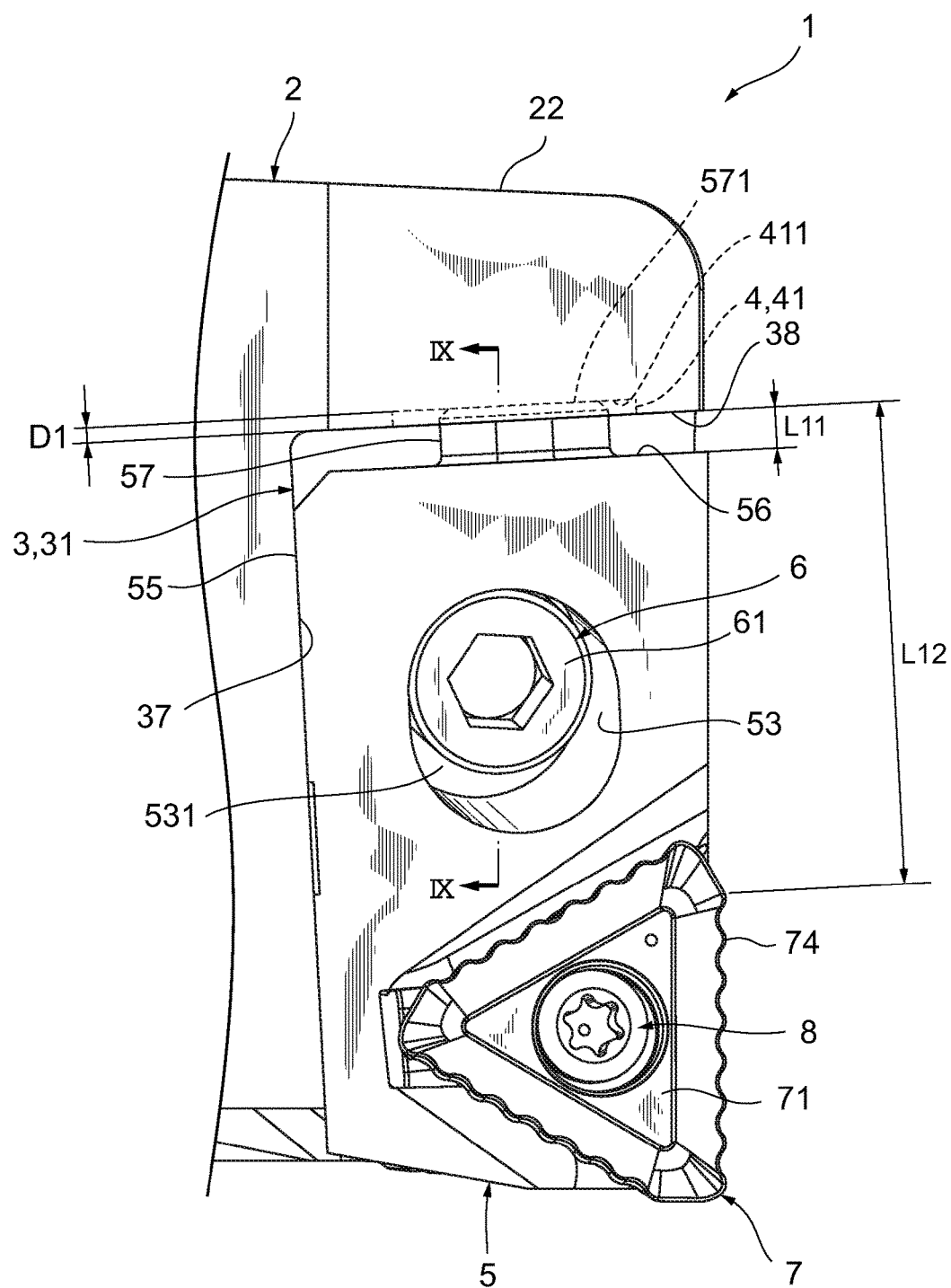
FIG. 8 is an enlarged view of the rotary cutting tool of FIG. 1.
Figure 9:
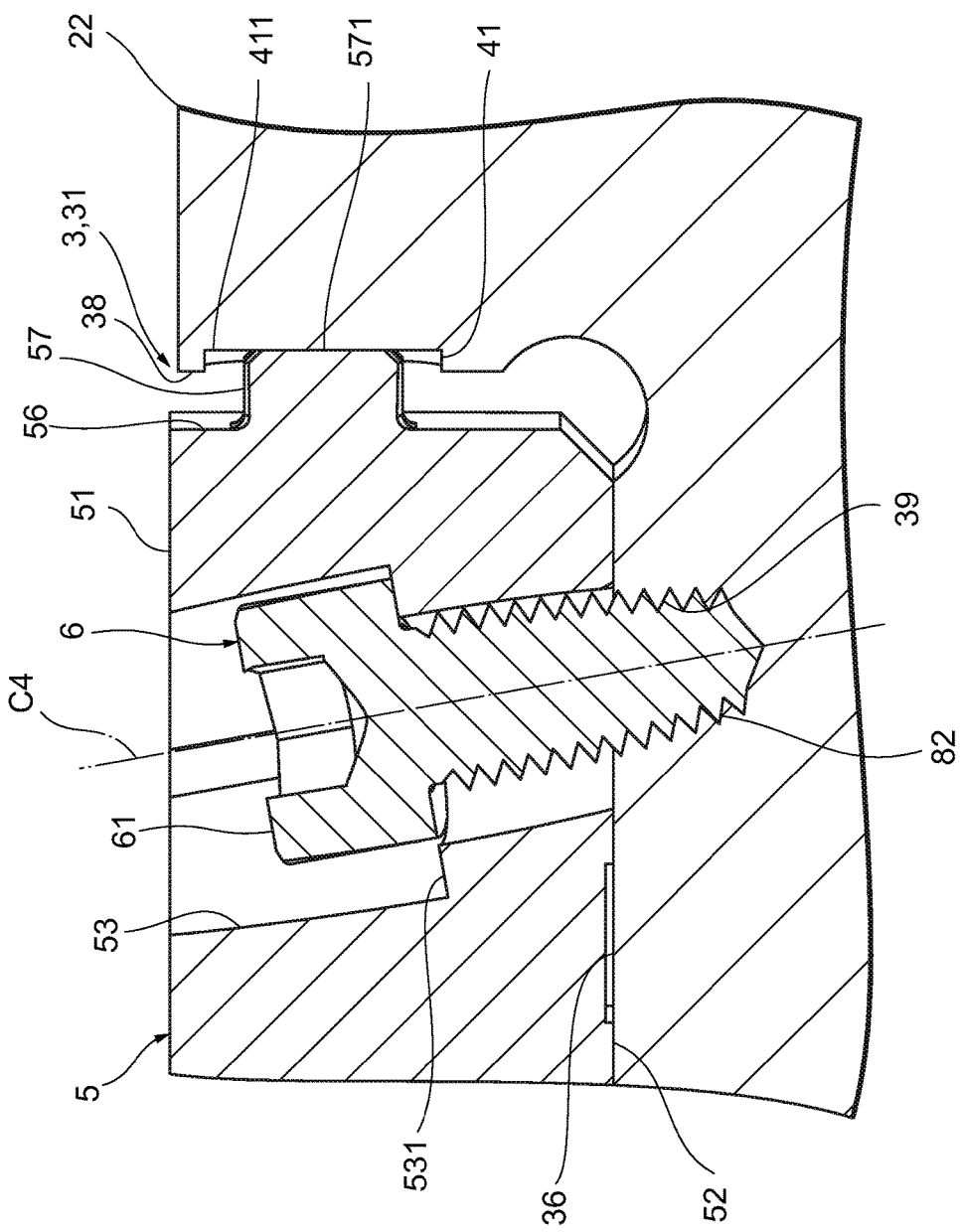
FIG. 9 is a cross-sectional view of a cross-section taken along IX-IX illustrated in FIG. 8.
Figure 10:
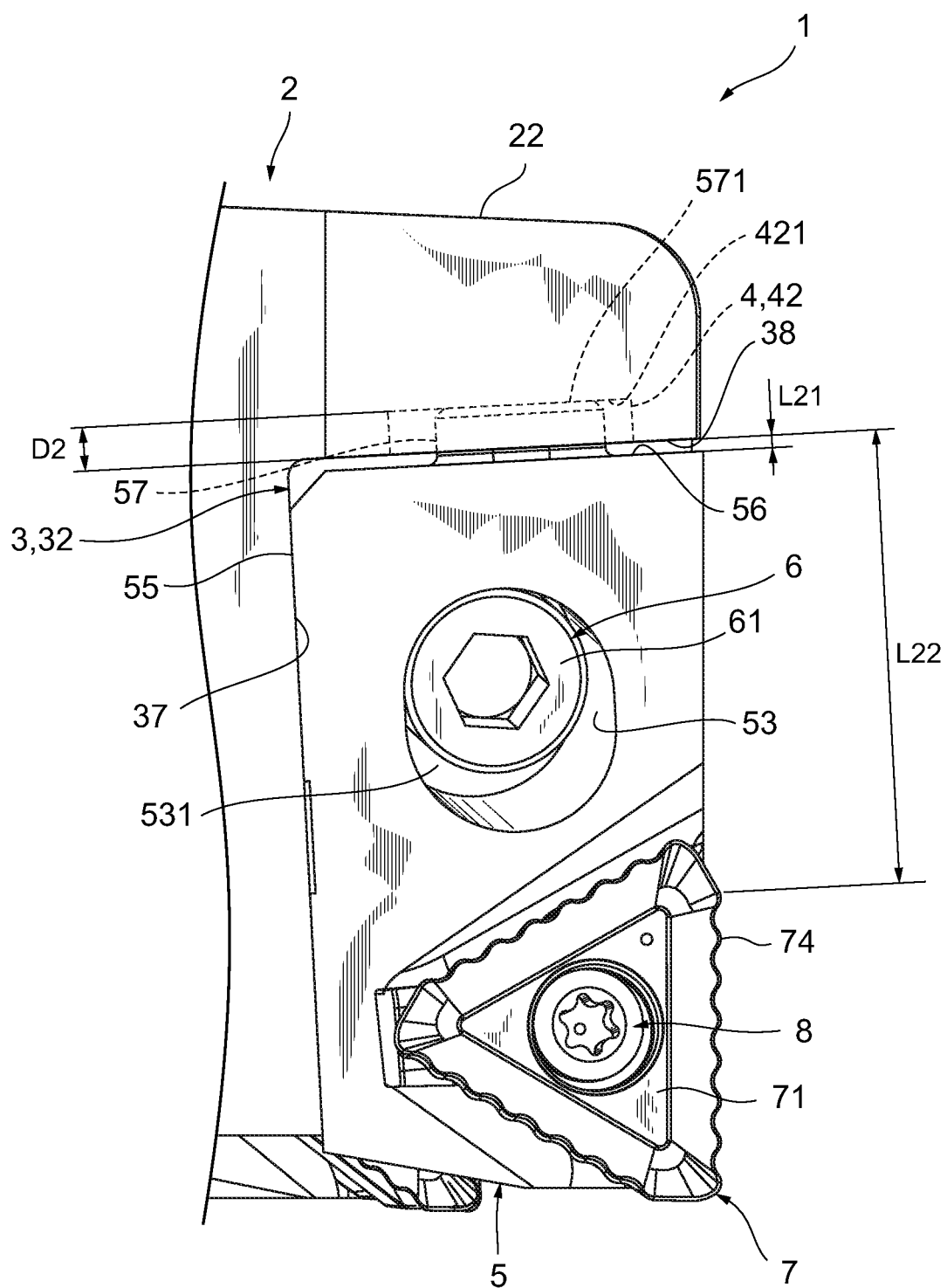
FIG. 10 is an enlarged view of the rotary cutting tool of FIG. 1.
Figure 11:
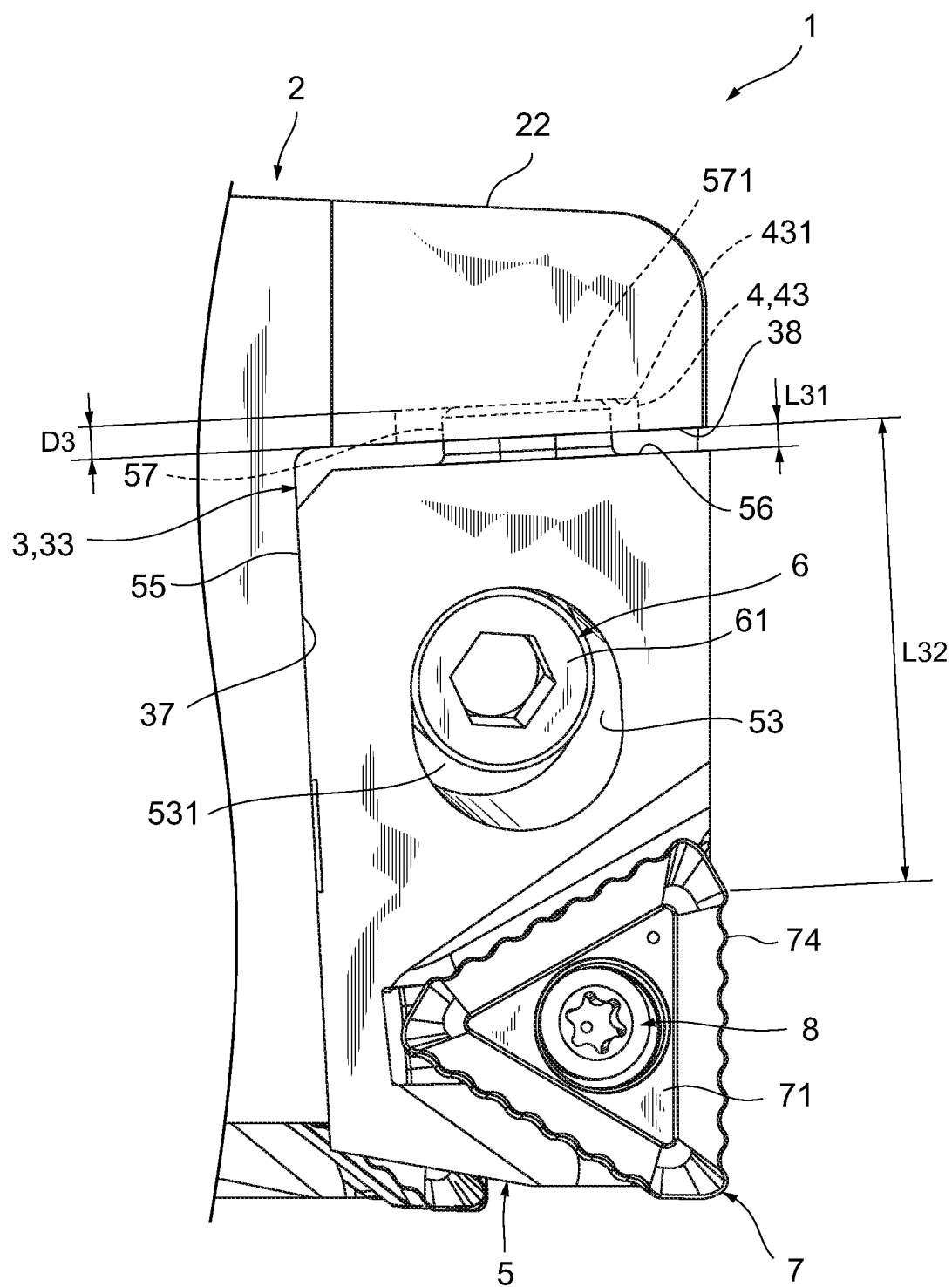
FIG. 11 is an enlarged view of the rotary cutting tool of FIG. 1.
Figure 12:
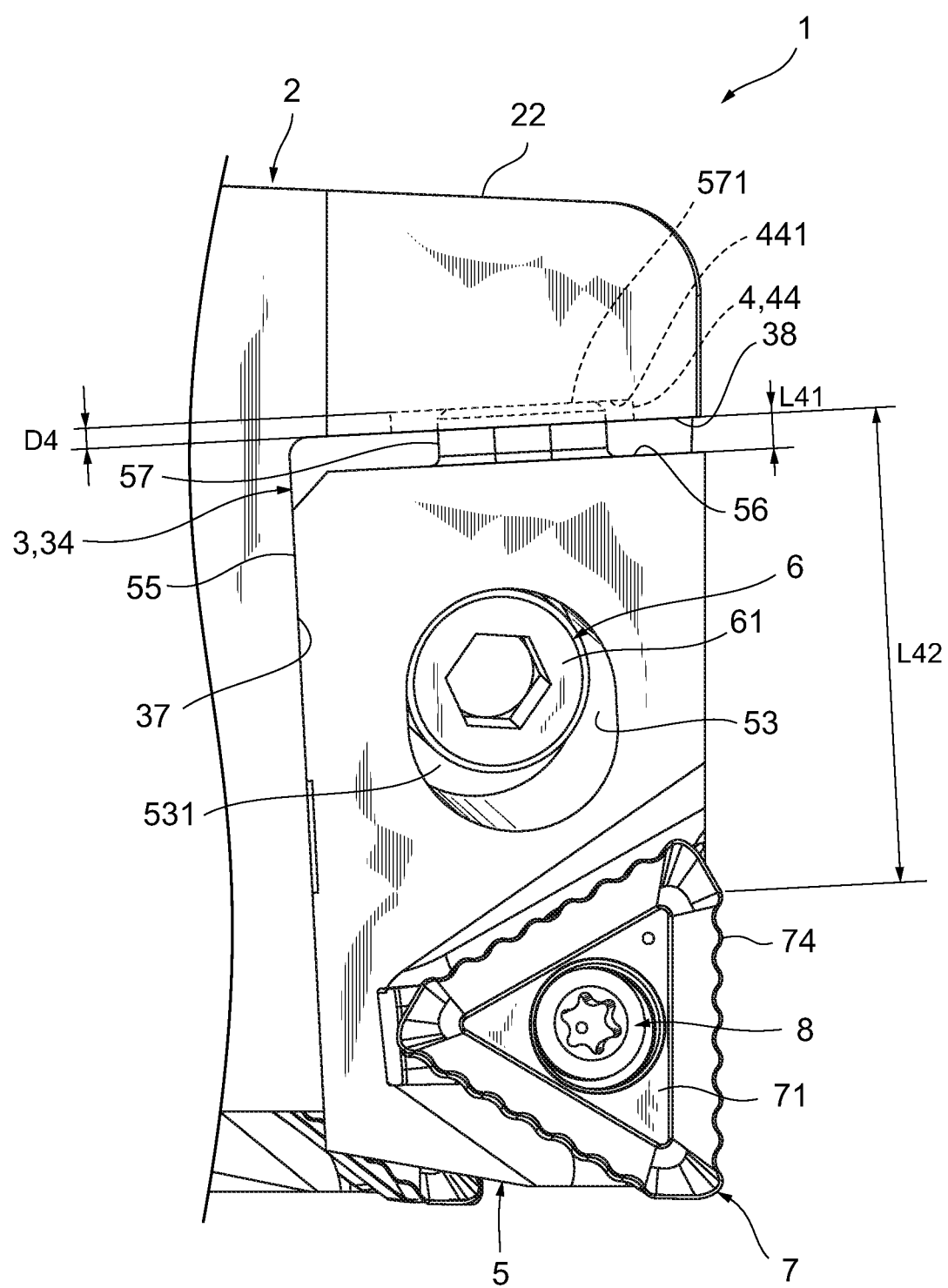
FIG. 12 is an enlarged view of the rotary cutting tool of FIG. 1.

The cutting tool 1 allows the arrangement of each cutting edge 74 to be adjusted by means of the above protrusion 57 and recessed part 4. Next, with reference to FIGS. 8 to 12, description will be made regarding the adjustment of the arrangement of each cutting edge 74. FIG. 8 is an enlarged view of the cutting tool 1, the view illustrating a part thereof near the first mounting seat 31. FIG. 9 is a cross-sectional view of a cross-section taken along IX-IX illustrated in FIG. 8. Each of FIGS. 10 to 12 is an enlarged view of the cutting tool 1. FIG. 10 shows a part of the cutting tool 1 which is near the second cartridge mounting seat 32, FIG. 11 shows a part of the cutting tool 1 which is near the third cartridge mounting seat 33, and FIG. 12 shows a part of the cutting tool 1 which is near the fourth cartridge mounting seat 34. FIGS. 8, 10, 11 and 12 each show the inside of the recessed part 4 with broken lines.

The respective upper wall surfaces 38 of the first cartridge mounting seat 31, the second cartridge mounting seat 32, the third cartridge mounting seat 33 and the fourth cartridge mounting seat 34, which are formed in the body 2, are arranged at equal positions in the axial direction. Meanwhile, the depth D1 of the first recessed part 41, the depth D2 of the second recessed part 42, the depth D3 of the third recessed part 43 and the depth D4 of the fourth recessed part are different from one another.

As to the cartridge 5 mounted on each cartridge mounting seat 3, the protrusion 57 thereof is inserted into the recessed part 4. Then, the leading end 571 of the protrusion 57 comes into contact with a bottom 411, 421, 431, 441 of each recessed part 4. As shown in FIG. 9, the central axis C4 of the bolt hole 39 formed in the cartridge mounting seat 3 is inclined so as to approach the upper wall surface 38, heading in the screwing direction of the bolt 6 (i.e., the depth direction of the bolt hole 39). Therefore, when the bolt 6 is screwed into the bolt hole 39, the cartridge 5 receives, at an inner side surface of the through hole 53, a force from the bolt 6 and is thereby pressed against the upper wall surface 38. As a result, the leading end 571 of the protrusion 57 reliably comes into contact with the bottom 411, 421, 431, 441 of the recessed part 4.

As described above, the cartridges 5 mounted on the respective cartridge mounting seats 3 all have the same shape, and the amounts of protrusion P (see FIG. 6) of the protrusions 57 are equal to one another. As shown in FIG. 8, the protrusion 57 of the cartridge 5 mounted on the first cartridge mounting seat 31 is inserted into the first recessed part 41. As described above, the amount of protrusion P of the protrusion 57 is greater than the depth D1 of the first recessed part 41. As a result, a distance from the upper wall surface 38 of the first cartridge mounting seat 31 to the outer side surface 56 of the cartridge 5 is denoted by L11, which is smaller than the amount of protrusion P of the protrusion 57.

The depth D2, which is shown in FIG. 10, of the second recessed part 42 of the second cartridge mounting seat 32 is greater than the depth D1 of the first recessed part 41 of the first cartridge mounting seat 31. Therefore, the protrusion 57 is inserted deeper into the second recessed part 42 then being inserted into the first recessed part 41. As a result, a distance from the upper wall surface 38 of the second cartridge mounting seat 32 to the outer side surface 56 of the cartridge 5 is denoted by L21, which is smaller than the distance L11.

The depth D3, which is shown in FIG. 11, of the third recessed part 43 of the third cartridge mounting seat 33 is greater than the depth D1 of the first recessed part 41 of the first cartridge mounting seat 31 and is smaller than the depth D2 of the second recessed part 42 of the second cartridge mounting seat 32. Therefore, the protrusion 57 is inserted deeper into the third recessed part 43 than being inserted into the first recessed part 41 and is inserted shallower thereinto than being inserted into the second recessed part 42. As a result, a distance from the upper wall surface 38 of the third cartridge mounting seat 33 to the outer side surface 56 of the cartridge 5 is denoted by L31, which is smaller than the distance L11 and greater than the distance L21.

The depth D4, which is shown in FIG. 12, of the fourth recessed part 44 of the fourth cartridge mounting seat 34 is greater than the depth D1 of the first recessed part 41 of the first cartridge mounting seat 31 and is smaller than the depth D3 of the third recessed part 43 of the third cartridge mounting seat 33. Therefore, the protrusion 57 is inserted deeper into the fourth recessed part 44 than being inserted into the first recessed part 41 and is inserted shallower thereinto than being inserted into the third recessed part 43. As a result, a distance from the upper wall surface 38 of the fourth cartridge mounting seat 34 to the outer side surface 56 of the cartridge 5 is denoted by L41, which is smaller than the distance L11 and greater than the distance L31.

That is, the depth of each recessed part 4 satisfies the relationship of D2>D3>D4>D1, and the distance from the upper wall surface 38 of each cartridge mounting seat 3 to the outer side surface 56 of the cartridge 5 satisfies the relationship of L11>L41>L31>L21. That is, the greater the depth of the recessed part 4, the shorter the distance from the upper wall surface 38 to the outer side surface 56 of the cartridge 5.

The differences between the distances L11, L21, L31 and L41 cause the differences between the respective distances from the upper wall surfaces 38 of the respective cartridge mounting seats 3 to the cutting edges 74 of the respective cutting inserts 7. In further detail, when regarding the respective distances from the upper wall surfaces 38 to the ends of the respective cutting edges 74 in the first cartridge mounting seat 31, the second cartridge mounting seat 32, the third cartridge mounting seat 33 and the fourth cartridge mounting seat 34 as L12 (see FIG. 8), L22 (see FIG. 10), L32 (see FIG. 11) and L42 (see FIG. 12), this satisfies the relationship of L12>L42>L32>L22. That is, the greater the depth of the recessed part 4, the shorter the distance from the upper wall surface 38 to the outer side surface 56 of the cartridge 5.

As described above, the cutting edges 74 are arranged differently between the cartridge mounting seats 3, whereby the arrangement of each cutting edge 74 can be adjusted in the axial direction such that portions which remain uncut by the cutting edge 74 of a given cutting insert 7 are cut by the cutting edge 74 of another cutting insert 7.

[Another Usage Form]

Figure 13:
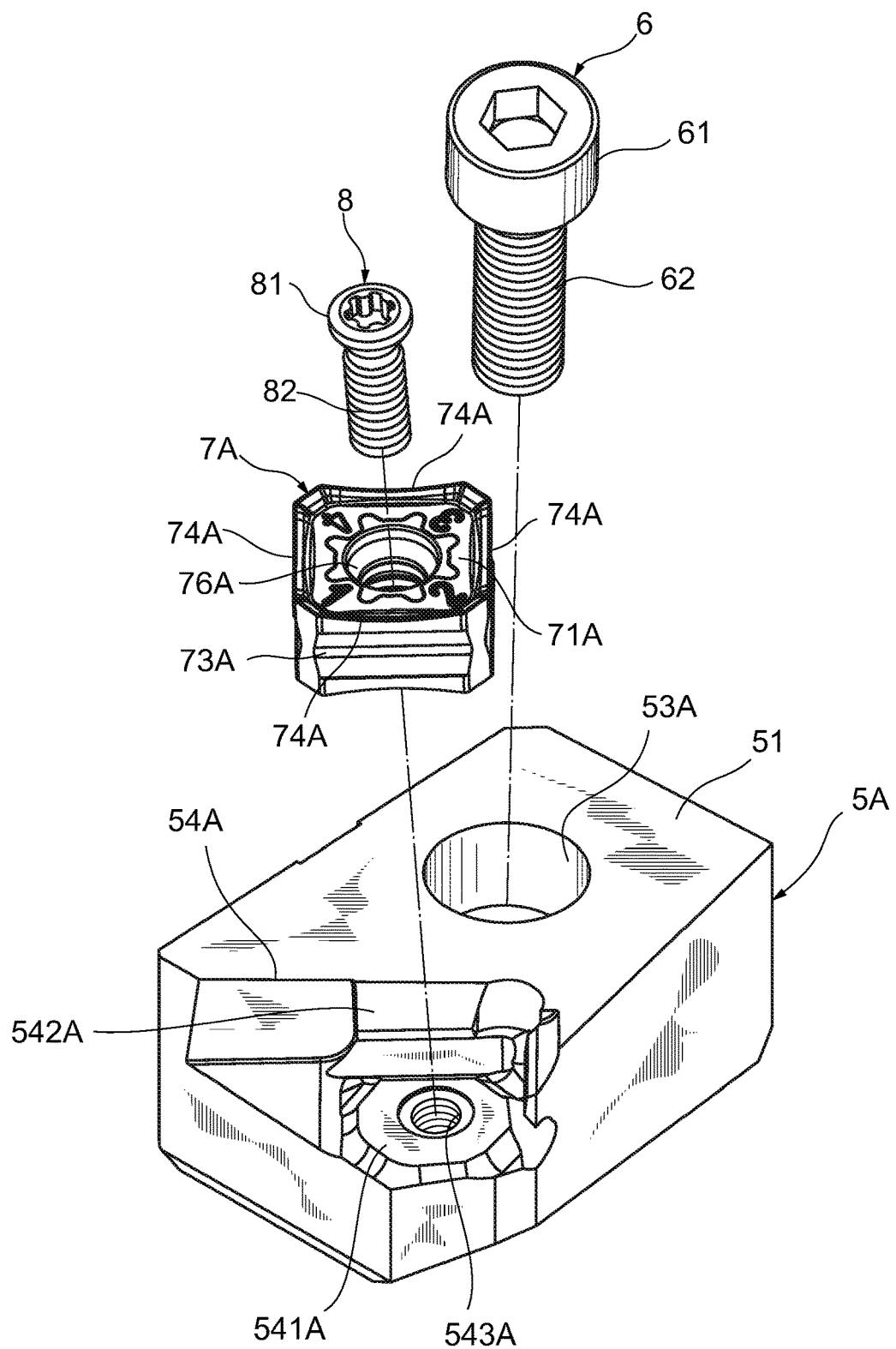
FIG. 13 is a perspective view of another cartridge and another cutting insert.
Figure 14:
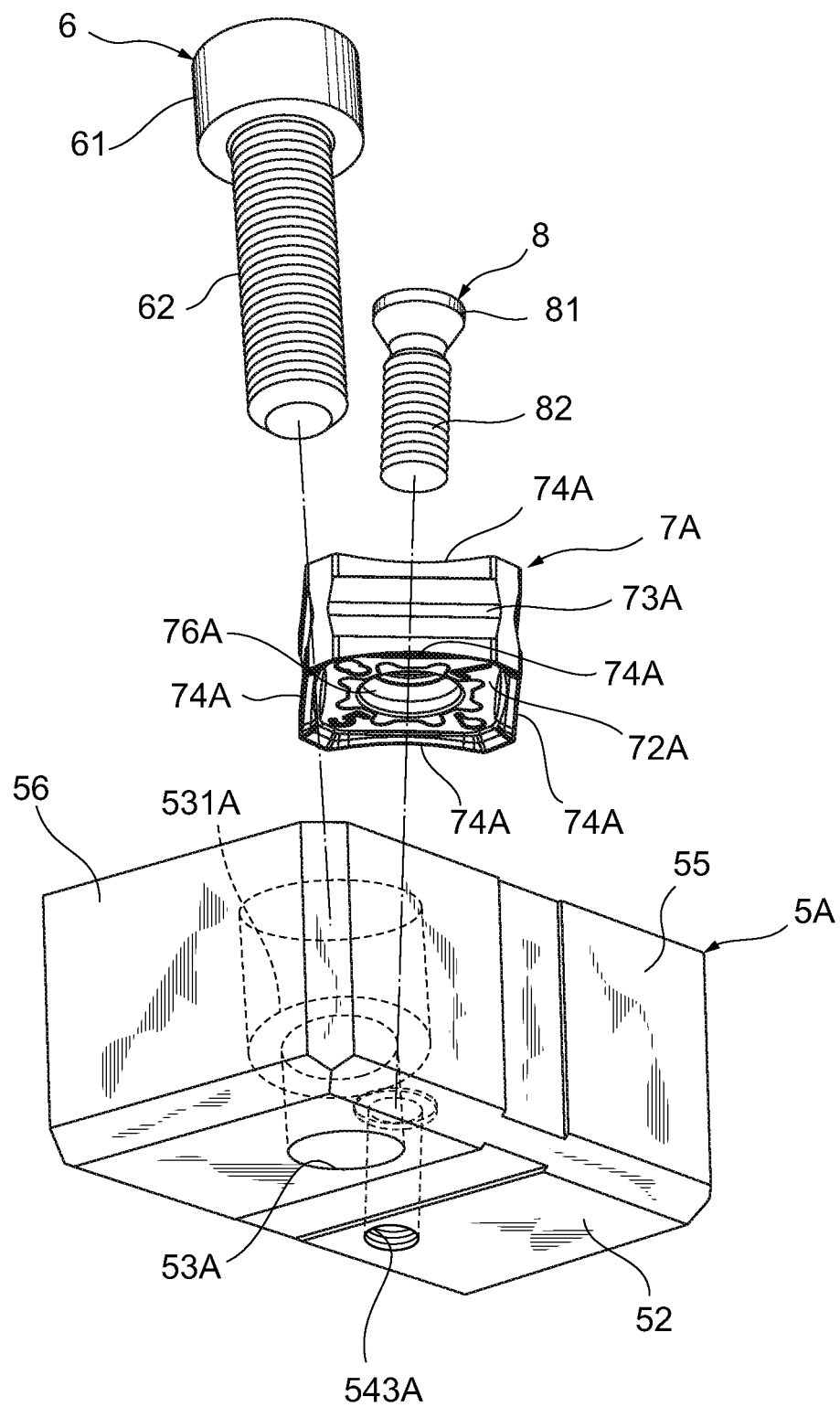
FIG. 14 is a perspective view of the cartridge of FIG. 13 and the cutting insert thereof.

The cutting tool 1 can also be used without involving the adjustment of the arrangement of each cutting edge. Next, such usage form for the cutting tool 1 will be described with reference to FIGS. 13 and 14. Each of FIGS. 13 and 14 is a perspective view of another cartridge 5A and another cutting insert 7A which are capable of being mounted on the body 2 (see FIG. 1, etc.). From among the components of the cartridge 5A and the cutting insert 7A, components having the same functions as the components of the cartridge 5 and the cutting insert 7, which have been described above, are denoted by the same symbols, and such components will not be further explained.

In place of the above cartridge 5, the cartridge 5A is configured to be capable of being mounted on each cartridge mounting seat 3 of the body 2. As shown in FIG. 14, no protrusion is formed in the outer side surface 56 of the cartridge 5A.

The cutting insert 7A has a first end surface 71A and a second end surface 72A. The first end surface 71A and the second end surface 72A oppose each other. The first end surface 71A and the second end surface 72A are provided, at substantially center parts thereof, with a through hole 76A which penetrates the first end surface 71A and the second end surface 72A. The first end surface 71A and the second end surface 72A each have a substantially quadrangular shape of rotational symmetry about a central axis of the through hole 76A.

The cutting insert 7A further has four peripheral side surfaces 73A which connect an edge of the first end surface 71A and an edge of the second end surface 72A. An intersecting edge between the first end surface 71A and each peripheral side surface 73A and an intersecting edge between the second end surface 72A and each peripheral side surface 73A each serve as a cutting edge 74A. That is, the cutting insert 7A is a so-called negative type cutting insert in which the cutting edges 74A are provided on both of the first end surface 71A side and the second end surface 72A side, and the cutting insert 7A has a total of eight cutting edges 74A.

No nick is formed in each peripheral side surface 73A. Therefore, each cutting edge 74A is not divided into portions, and generally the entire cutting edge 74A substantially contributes to cutting. Such cutting edge 74A does not invite portions of a workpiece which remain uncut due to nicks, as opposed to the cutting edge 74 of the above cutting insert 7, and thus, the arrangement of each cutting edge 74A is not specially needed to be adjusted.

The cutting insert 7A is arranged on an insert mounting seat 54A of the cartridge 5A such that the second end surface 72A comes into contact with a bottom surface 541A of the insert mounting seat 54A and the peripheral side surface 73A comes into contact with a side wall surface 542A of the insert mounting seat 54A. The cutting insert 7A is arranged at a posture in which the cutting edge 74A is exposed outward from the cartridge 5A. The bolt 8 is inserted through the through hole 76A of the cutting insert 7A. The shaft part 82 of the bolt 8 is screwed into a bolt hole 543A, whereby the cutting insert 7A is mounted on the insert mounting seat 54A.

The cartridge 5A on which the cutting insert 7A has been mounted is arranged on each cartridge mounting seat 3 of the body 2. The cartridges 5A which are mounted on the respective cartridge mounting seats 3 all have the same shape. Each cartridge 5A is arranged such that the lower surface 52 comes into contact with the bottom surface 36 (see FIG. 3) of the cartridge mounting seat 3 and the outer side surface 55 thereof comes into contact with the side wall surface 37 (see FIG. 3) of the cartridge mounting seat 3.

Further, the outer side surface 56 of the cartridge 5A is arranged so as to oppose the upper wall surface 38 (see FIG. 3) of the cartridge mounting seat 3. Since no protrusion is formed in the outer side surface 56, the outer side surface 56 comes into contact with the upper wall surface 38. The cartridge 5A is mounted on each cartridge mounting seat 3 by means of the bolt 6 which is inserted through the through hole 53A.

Since the outer side surface 56 of the cartridge 5A comes into contact with the upper wall surface 38 of the cartridge mounting seat 3, no difference occurs between the respective distances from the upper wall surfaces 38 to the cutting edges 74A. Therefore, with the cartridge 5A and the cutting insert 7A, it is possible to perform cutting without the adjustment of the arrangement of each cutting edge 74A.

[Operation and Effects]

With the configuration of the cutting tool 1, the protrusion 57 of the outer side surface 56 of the cartridge 5 can be inserted into each of the first recessed part 41 formed in the upper wall surface 38 (corresponding to a "first wall surface") of the first cartridge mounting seat 31 and the second recessed part 42 formed in the upper wall surface 38 (corresponding to a "second wall surface") of the second cartridge mounting seat 32.

The depth D2 of the second recessed part 42 is greater than the depth D1 of the first recessed part 41. Further, the amount of protrusion P of the protrusion 57 of the cartridge 5 is equal to or greater than the depth D2 of the second recessed part 42. Thus, the protrusion 57 of the cartridge 5 mounted on the second cartridge mounting seat 32 is inserted deeper than the protrusion 57 of the cartridge 5 mounted on the first cartridge mounting seat 31. As a result, the distance L21, which ranges from the outer side surface 56 of the cartridge 5 to the upper wall surface 38 of the second cartridge mounting seat 32, is smaller than the distance L11, which ranges from the outer side surface 56 of the cartridge 5 to the upper wall surface 38 of the first cartridge mounting seat 31.

Accordingly, with the above configuration, based on the difference in the distance which occurs, as described above, between the cartridge 5 mounted on the first cartridge mounting seat 31 and the cartridge 5 mounted on the second cartridge mounting seat 32, the arrangement of each cutting edge 74 of each cutting insert 7 mounted on each of such cartridge mounting seats can be adjusted. That is, when mounting the cartridge on the first cartridge mounting seat 31 or the second cartridge mounting seat 32, the arrangement of each cutting edge 74 can be adjusted through the simple work of inserting the protrusion 57 into the first recessed part 41 or the second recessed part 42 and then bringing the leading end 571 of the protrusion 57 into contact with the bottom 411, 421.

When using the cutting insert 7A which does not specially require the adjustment of the arrangement of each cutting edge 74A, the cartridge 5A may be separately prepared which does not have a protrusion in the outer side surface 56. By mounting the cutting insert 7A on the cartridge 5A with no protrusion and then mounting such cartridge 5A on the first cartridge mounting seat 31 or the second cartridge mounting seat 32, the cutting insert 7A can be mounted on the body 2 via the cartridge 5A without the adjustment of the arrangement of the cutting edge 74A.

The first recessed part 41 and the second recessed part 42 are formed so as to extend in the direction substantially parallel to the axis C1.

With the above configuration, the arrangement of each cutting edge 74 can be adjusted in the direction substantially parallel to the axis C1. As to the cutting tool 1 in which the axis C1 is arranged so as to extend in the vertical direction, the arrangement of each cutting edge 74 can be adjusted in the vertical direction.

The width of the first recessed part 41 and the width of the second recessed part 42 are each greater than the width of the protrusion 57.

As described above, the arrangement of each cutting edge 74 is adjusted by the leading end 571 of the protrusion 57 of the cartridge 5 coming into contact with the bottom 411, 421 of the first recessed part 41 or the second recessed part 42. In other words, the width of the first recessed part 41 and the width of the second recessed part 42 do not affect the adjustment of the arrangement of each cutting edge 74. Therefore, by making each of the width of the first recessed part 41 and the width of the second recessed part 42 greater than the width of the protrusion 57, the arrangement of each cutting edge 74 can be adjusted while the protrusion 57 can be smoothly inserted into the first recessed part 41 or the second recessed part 42.

The amount of protrusion P of the protrusion 57 is greater than the depth D2 of the second recessed part 42.

The depth D2 of the second recessed part 42 is greater than each of the other depths D1, D3 and D4. Therefore, when the amount of protrusion P of the protrusion 57 is greater than the depth D2 of the second recessed part 42, the outer side surface 56 of the cartridge 5 does not come into contact with the upper wall surface 38 of each cartridge mounting seat 3. In other words, the arrangement of each cutting edge 74 is defined by the position of the leading end 571 of the protrusion 57 rather than the position of the outer side surface 56 provided with the protrusion 57.

That is, when the amount of protrusion P of the protrusion 57 is greater than the depth D2 of the second recessed part 42, high accuracy is not required for the dimension ranging from the cutting edge 74 of the cutting insert 7 to the outer side surface 56 of the cartridge 5 because such dimension does not affect the adjustment of the arrangement of each cutting edge 74. As a result, it becomes possible to easily manage dimension accuracy during the manufacture of the cartridge 5.

The cartridge 5 is provided with the through hole 53. The first cartridge mounting seat 31 is provided with the bolt hole 39 (corresponding to a "first bolt hole") into which the bolt 6 (corresponding to a "first bolt") is screwed, such bolt 6 having been inserted through the through hole 53 of the cartridge 5. The second cartridge mounting seat 32 is provided with the bolt hole 39 (corresponding to a "second bolt hole") into which the bolt 6 (corresponding to a "second bolt") is screwed, such bolt 6 having been inserted through the through hole 53 of the cartridge 5. The bolt hole 39 is inclined so as to approach the upper wall surface 38, heading in the screwing direction of the bolt 6.

With the above configuration, the cartridge 5 can be mounted on the first cartridge mounting seat 31 or the second cartridge mounting seat 32 by means of the bolt 6 which is inserted through the through hole 53. Since the bolt hole 39 is inclined, the bolt 6 which is screwed into the bolt hole 39 can press the cartridge 5 against the upper wall surface 38. This reliably brings the leading end 571 of the protrusion 57 of the cartridge 5 into contact with the bottom 411, 421 of the first recessed part 41 or the second recessed part 42, and this allows the arrangement of each cutting edge 74 to be adjusted in a more reliable manner.

The through hole 53 of the cartridge 5 has a long-hole shape whose longitudinal direction is served by a protruding direction of the protrusion 57.

With the above configuration, the bolt 6 which has been inserted through the through hole 53 of the cartridge 5 is inclined, and this allows the bolt 6 to be reliably screwed into the bolt hole 39.

The center C3 of the protrusion 57 is offset from the central axis C2 of the through hole 53 of the cartridge 5.

When a cutting resistance works on the cutting edge 74 of the cutting insert 7, a moment about a part of the cartridge 5 which is near the through hole 53 works on the cartridge 5. When the center C3 of the protrusion 57 is offset from the central axis C2 of the through hole 53 of the cartridge 5, this moment can be resisted by a counterforce received by the leading end 571 of the protrusion 57 from the bottom 411, 421 of the first recessed part 41 or the second recessed part 42. This can maintain a state in which the cartridge 5 is mounted on the first cartridge mounting seat 31 or the second cartridge mounting seat 32. That is, with the above configuration, the protrusion 57 provided for the adjustment of the arrangement of each cutting edge 74 can also be utilized for stable mounting of the cartridge 5.

Second Embodiment

Figure 15:
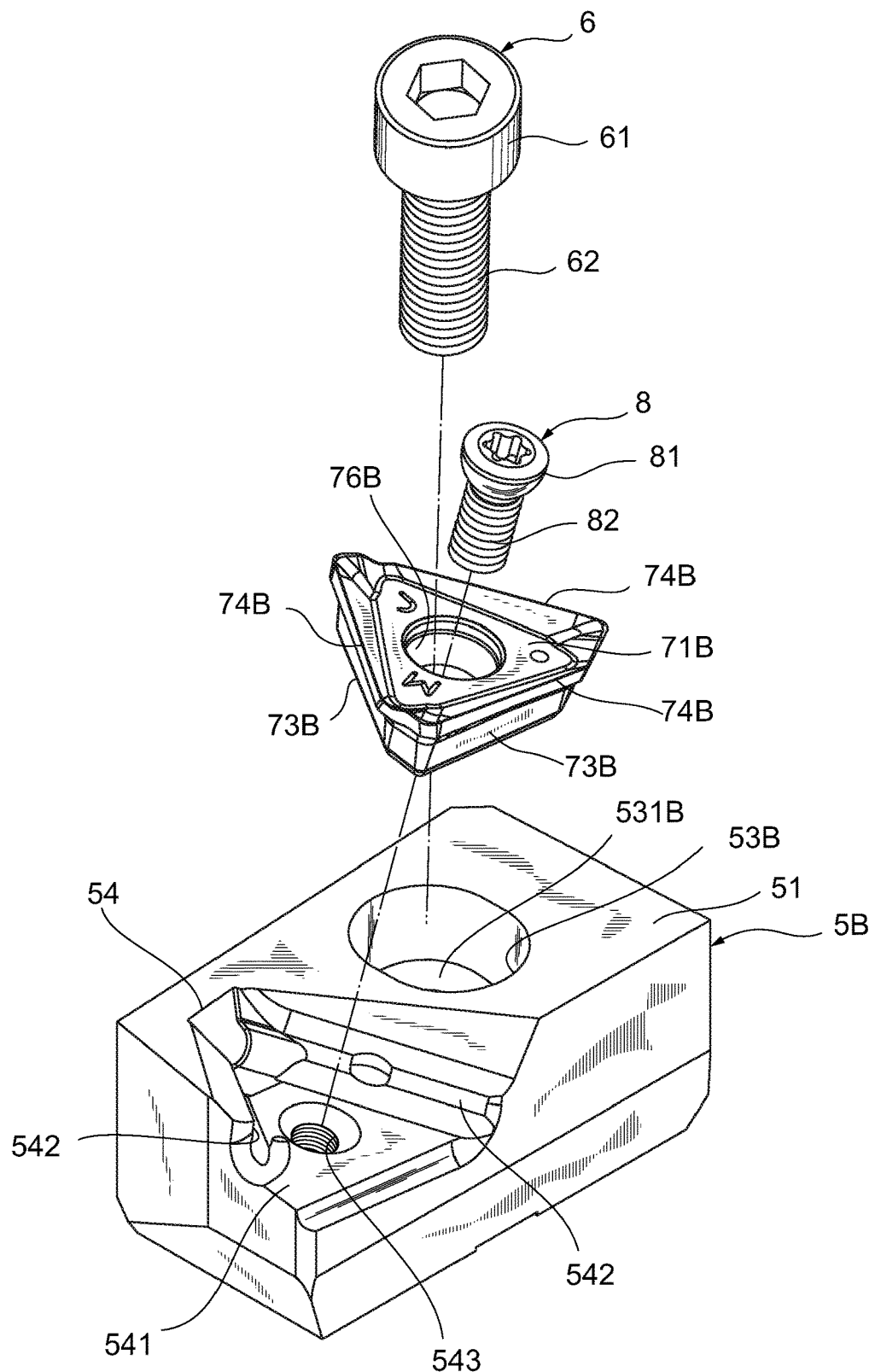
FIG. 15 is a perspective view of a cartridge and a cutting insert of a rotary cutting tool according to a second embodiment.
Figure 16:
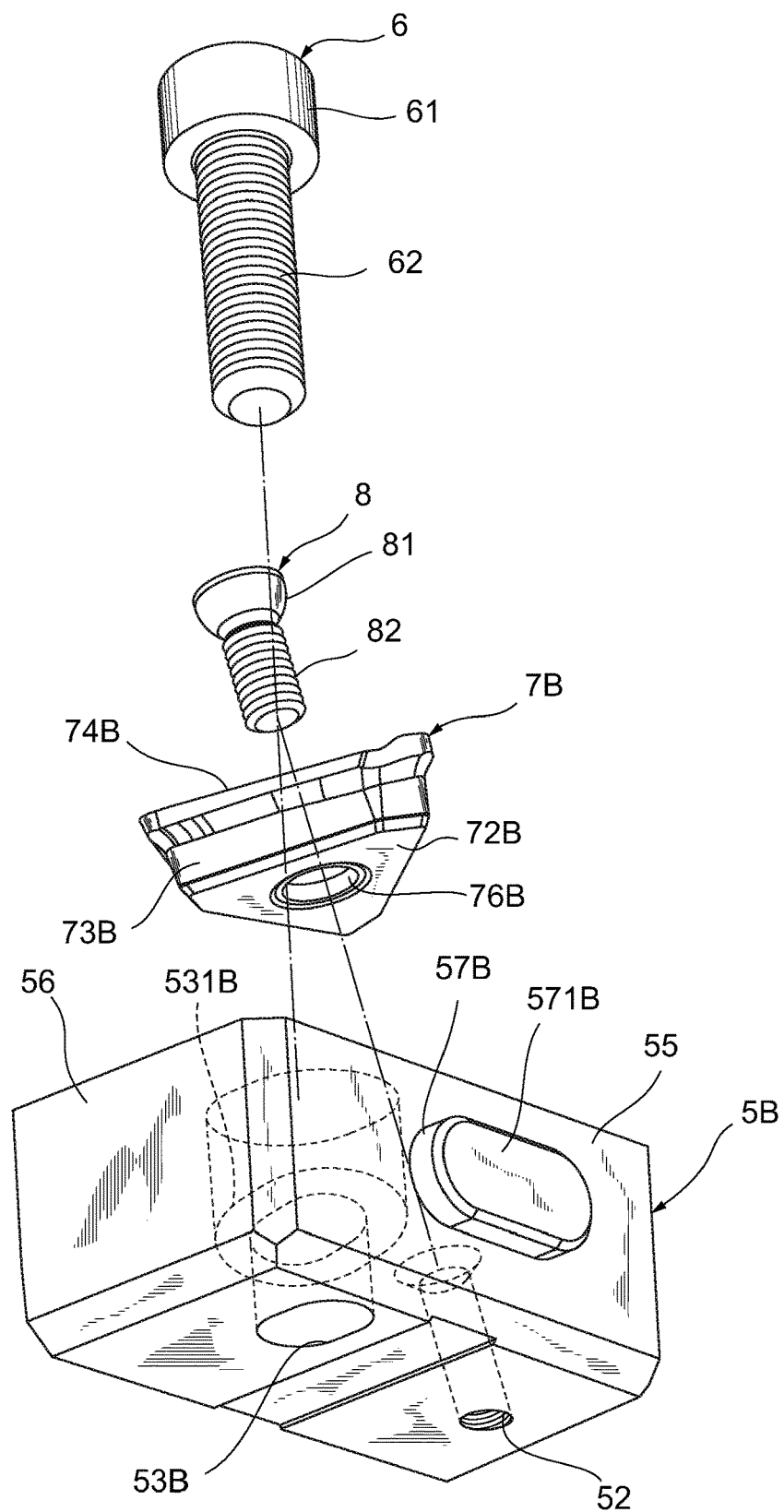
FIG. 16 is a perspective view of the cartridge of FIG. 15 and the cutting insert thereof.
Figure 17:
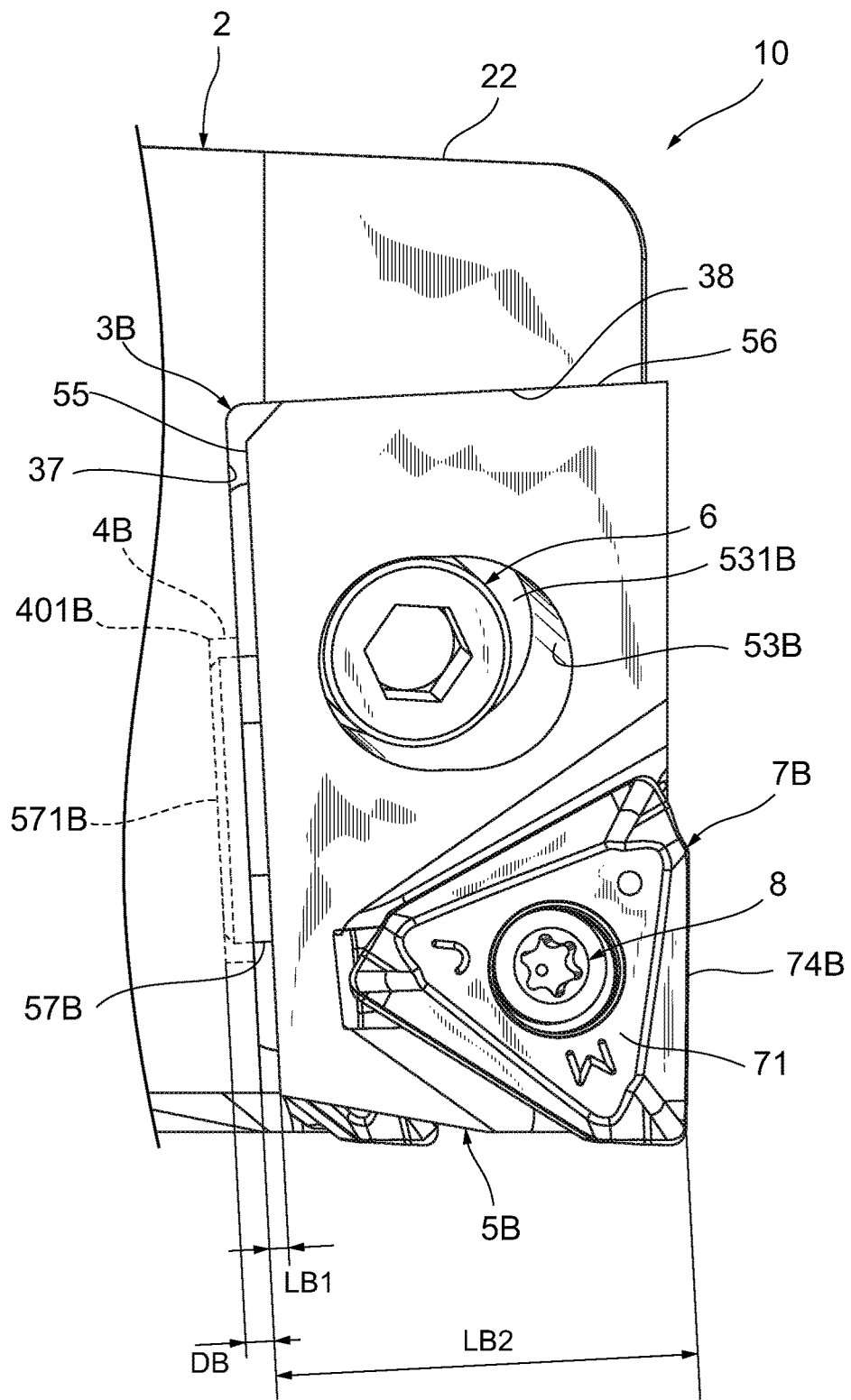
FIG. 17 is an enlarged view of the rotary cutting tool according to the second embodiment.

Next, a rotary cutting tool 10 (hereinafter referred to as "cutting tool 10") according to a second embodiment will be described with reference to FIGS. 15 to 17. The cutting tool 10 has a configuration of being capable of adjusting the arrangement of a cutting edge 74B in a radial direction. Each of FIGS. 15 and 16 is a perspective view of a cartridge 5B and a cutting insert 7B of the cutting tool 10. FIG. 17 is an enlarged view of the cutting tool 10, the view showing a part of the cutting tool 10 which is near a cartridge mounting seat 3B. From among the components of the cutting tool 10, components having the same functions as the components of the cutting tool 1 according to the above first embodiment are denoted by the same symbols, and such components will not be further explained.

As shown in FIG. 17, each projected part 22 of the body 2 of the cutting tool 10 is provided with the cartridge mounting seat 3B. The cartridge mounting seat 3B is a generic name for the components formed in each projected part 22.

A side wall surface 37 (corresponding to a "first wall surface" or "second wall surface") of the cartridge mounting seat 3B is provided, at substantially a center part thereof, with a recessed part 4B (corresponding to a "first recessed part" or "second recessed part"). The recessed part 4B is a generic name for the components formed in each cartridge mounting seat 3B. The recessed part 4B is formed so as to extend in a direction which is substantially perpendicular to the side wall surface 37 and which is substantially orthogonal to the axis C1 (see FIGS. 1 and 2). Further, a width of the recessed part 4B (i.e., a dimension of the recessed part 4B in a direction orthogonal to a direction in which the recessed part 4B extends) is greater than a width of a protrusion 57B of the cartridge 5B, which will be described below.

The side wall surfaces 37 of the cartridge mounting seats 3B are arranged at equal positions in the radial direction. Meanwhile, a depth DB of the recessed part 4B varies, depending on the cartridge mounting seat 3B.

One cartridge 5B is removably mounted on each cartridge mounting seat 3B. The cartridge 5B is made of a metal material, and the cutting insert 7B is removably mounted on the cartridge 5B. The cartridges 5B which are respectively mounted on the cartridge mounting seats 3B all have the same shape.

As shown in FIGS. 15 and 16, the cartridge 5 is provided with a through hole 53B which penetrates the upper surface 51 and the lower surface 52. As shown in FIG. 16, the through hole 53B is a countersunk hole inside which a stepped part 531B is formed. The through hole 53B has a long-hole shape whose longitudinal direction is served by a direction in which the protrusion 57B, which will be described below, protrudes.

No protrusion is formed in the outer side surface 56 of the cartridge 5B, and the protrusion 57B is formed in the outer side surface 55. The protrusion 57B protrudes in a direction substantially perpendicular to the outer side surface 55. The amount of protrusion of the protrusion 57 is greater than the depth DB of the recessed part 4.

As shown in FIGS. 15 and 16, the cutting insert 7B has a first end surface 71B and a second end surface 72B. The first end surface 71B and the second end surface 72B oppose each other and are provided, at center parts thereof, with a through hole 76B which penetrates the first end surface 71B and the second end surface 72B. The first end surface 71B and the second end surface 72B each have a substantially triangular shape of rotational symmetry about a central axis of the through hole 76B.

The cutting insert 7B further has three peripheral side surfaces 73B which connect an edge of the first end surface 71B and an edge of the second end surface 72B. An intersecting edge between the first end surface 71B and each peripheral side surface 73B is regarded as the cutting edge 74B. That is, the cutting insert 7B has three cutting edges 74B.

No nick is formed in each peripheral side surface 73B of the cutting insert 7B. Therefore, each cutting edge 74B is not divided into portions, and generally the entire cutting edge 74B substantially contributes to cutting. Such cutting edge 74B does not invite portions of a workpiece which remain uncut due to nicks, as opposed to the cutting edge 74 of the above cutting insert 7.

However, when the rotational speed of the body 2 is high, so that the cutting insert 7B receives a large cutting resistance from a workpiece, the arrangement of each cutting edge 74B may need to be adjusted. In other words, the arrangement of each cutting edge 74B may need to be adjusted in order to make the cutting resistances which work on the cutting edges 74B of the cutting inserts 7B uniform and in turn to extend the lives of the cutting edges 74B.

In the cutting tool 10, the arrangement of each cutting edge 74B is adjusted by means of the above protrusion 57B and the recessed part 4B below. Next, the adjustment of the arrangement of each cutting edge 74B will be described.

As shown in FIG. 17, as to the cartridge 5B mounted on each cartridge mounting seat 3B, the protrusion 57B thereof is inserted into the recessed part 4B. Then, a leading end 571B of the protrusion 57B comes into contact with a bottom 401B of each recessed part 4B. A central axis of a bolt hole (not shown) formed in the cartridge mounting seat 3B is inclined so as to approach the side wall surface 37, heading in the screwing direction of the bolt 6. Therefore, when the bolt 6 is screwed into the bolt hole, the cartridge 5B receives, at an inner side surface of the through hole 53B, a force from the bolt 6 and is thereby pressed against the side wall surface 37. As a result, the leading end 571B of the protrusion 57B reliably comes into contact with the bottom 401B of the recessed part 4B.

As described above, the amount of protrusion of the protrusion 57B is greater than the depth DB of the recessed part 4B below. Thus, a distance from the side wall surface 37 of the cartridge mounting seat 3B to the outer side surface 55 of the cartridge 5B is denoted by LB1, which is smaller than the amount of protrusion of the protrusion 57B. Further, a distance from the side wall surface 37 to the cutting edge 74B is denoted by LB2.

As to the cutting tool 10, the difference in each of the distances LB1 and LB2 is caused between the cartridges 5 by adjusting the depth DB of the recessed part 4B of each cartridge mounting seat 3B, so that the arrangement of each cutting edge 74B can be adjusted. That is, with the above configuration, the arrangement of the cutting edge 74B of the cutting insert 7B can be adjusted in a direction substantially orthogonal to the axis C1 (see FIGS. 1 and 2).

Embodiments of the present invention have been described above with reference to specific examples. However, the present invention is not limited to these specific examples. That is, examples obtained by a person skilled in the art by appropriately applying design choices to any of the specific examples also fall within the scope of the present invention, as long as they comprise the features of the present invention. The elements of the above specific examples as well as the arrangements, materials, conditions, shapes, sizes, etc. are not limited to those illustrated above and may be changed as appropriate.

REFERENCE SIGNS LIST 1, 10: Rotary cutting tool
2: Body
3, 3B: Cartridge mounting seat
31: First cartridge mounting seat
32: Second cartridge mounting seat
37: Side wall surface (first wall surface, second wall surface)
38: Upper wall surface (first wall surface, second wall surface)
39: Bolt hole (first bolt hole, second bolt hole)
4: Recessed part
4B: Recessed part (first recessed part, second recessed part)
401B: Bottom
41: First recessed part
411: Bottom
42: Second recessed part
421: Bottom
5, 5A, 5B: Cartridge
53, 53A, 53B: Through hole
54, 54A: Insert mounting seat
55: Outer side surface
56: Outer side surface
57, 57B: Protrusion
571, 571B: Leading end
6: Bolt (first bolt, second bolt)
7, 7A, 7B: Cutting insert
74, 74A, 74B: Cutting edge
C1: Axis

What is claimed is:

1. A rotary cutting tool which cuts a workpiece through rotation, the rotary cutting tool comprising:
a plurality of cutting inserts each having a cutting edge;
a plurality of cartridges each having an insert mounting seat on which the cutting insert is mounted; and
a body having a first cartridge mounting seat and a second cartridge mounting seat at positions separate from each other in a circumferential direction of a predetermined axis, the first cartridge mounting seat and the second cartridge mounting seat each having the cartridge mounted thereon, wherein:
each of the plurality of cartridges has a protrusion in an outer side surface of the cartridge;
the first cartridge mounting seat has:
a first wall surface opposing the outer side surface of the cartridge mounted on the first cartridge mounting seat; and
a first recessed part which is formed in the first wall surface, into which the protrusion is inserted, and which comes into contact, at a bottom thereof, with a leading end of the protrusion;
the second cartridge mounting seat has:
a second wall surface which faces in a same direction as the first wall surface and which opposes the outer side surface of the cartridge mounted on the second cartridge mounting seat; and
a second recessed part which is formed in the second wall surface, into which the protrusion is inserted, and which comes into contact, at a bottom thereof, with the leading end of the protrusion;
a depth of the second recessed part is greater than a depth of the first recessed part; and
an amount of protrusion of the protrusion is equal to or greater than the depth of the second recessed part.

2. The rotary cutting tool according to claim 1, wherein the first recessed part and the second recessed part are formed so as to extend in a direction substantially parallel to the axis.

3. The rotary cutting tool according to claim 1, wherein the first recessed part and the second recessed part are formed so as to extend in a direction substantially orthogonal to the axis.

4. The rotary cutting tool according to claim 1, wherein a width of the first recessed part and a width of the second recessed part are each greater than a width of the protrusion.

5. The rotary cutting tool according to claim 1, wherein an amount of protrusion of the protrusion is greater than the depth of the second recessed part.

6. The rotary cutting tool according to claim 1, wherein:
the cartridge is provided with a through hole;
the first cartridge mounting seat is provided with a first bolt hole into which a first bolt is screwed, the first bolt being inserted through the through hole of the cartridge;
the second cartridge mounting seat is provided with a second bolt hole into which a second bolt is screwed, the second bolt being inserted through the through hole of the cartridge;
the first bolt hole is inclined so as to approach the first wall surface, heading in a screwing direction of the first bolt; and
the second bolt hole is inclined so as to approach the second wall surface, heading in a screwing direction of the second bolt.

7. The rotary cutting tool according to claim 6, wherein the through hole of the cartridge has a long-hole shape whose longitudinal direction is served by a protruding direction of the protrusion.

8. The rotary cutting tool according to claim 6, wherein a center of the protrusion is offset from a central axis of the through hole of the cartridge.

* * * * *